United States Patent [19]

Luttringer et al.

[11] Patent Number: 5,071,442

[45] Date of Patent: Dec. 10, 1991

[54] PROCESS FOR DYEING OR PRINTING CELLULOSIC TEXTILE FIBRE MATERIAL BY THE TRICHROMATIC TECHNIQUE: REACTIVE DYES

[75] Inventors: Jean P. Luttringer, Rixheim, France; Athanassios Tzikas, Pratteln, Switzerland; Pierre Galafassi, Hegenheim, France

[73] Assignee: Ciba-Geigy Corporation, Ardsley, N.Y.

[21] Appl. No.: 638,253

[22] Filed: Jan. 4, 1991

[30] Foreign Application Priority Data

Jan. 9, 1990 [CH] Switzerland ........................ 57/90
Feb. 21, 1990 [CH] Switzerland ...................... 567/90
May 9, 1990 [CH] Switzerland .................... 1569/90

[51] Int. Cl.$^5$ ............... C09B 62/00; C09B 62/04; C09B 62/20; C09B 62/343
[52] U.S. Cl. ........................ 8/549; 8/543; 8/638; 8/641; 8/643; 8/676; 8/678; 8/680; 8/681; 8/684; 8/685; 8/686; 8/687; 8/688; 8/918
[58] Field of Search ................... 8/549, 641

[56] References Cited

U.S. PATENT DOCUMENTS

| | | | |
|---|---|---|---|
| 4,560,480 | 12/1985 | Lacroix et al. | 210/638 |
| 4,785,081 | 11/1988 | Franke | 534/598 |
| 4,999,027 | 3/1991 | Lehmann et al. | 8/543 |

FOREIGN PATENT DOCUMENTS 01-170661 7/1989 Japan.
01-170663 7/1989 Japan.
01-170664 7/1989 Japan.
01-170665 7/1989 Japan.

OTHER PUBLICATIONS

Abstract of Japan, vol. 013, #442, 10/3/89 (JP-A-01170661).
Abstract of Japan, vol. 013, #442, 10/3/89 (JP-A-01170665).
Abstract of Japan, vol. 013, #442, 10/3/89 (JP-A-01170664).
Abstract of Japan, vol. 013, #442, 10/3/89 (JP-A-01170663).

*Primary Examiner*—A. Lionel Clingman
*Attorney, Agent, or Firm*—George R. Dohmann; Edward McC. Roberts

[57] ABSTRACT

A process for dyeing or printing cellulosic textile fibre materials by the trichromatic technique, which process comprises dyeing or printing said materials from an aqueous liquor with at least one red or reddish brown dyeing dye of formula (1) $(HO_3S)_{0-2}$—$A_1$—N=N—[naphthalene with OH, HO$_3$S]—NH—Z, $(SO_3H)_{0-1}$ or (2) $(HO_3S)_{1-2}$—[phenyl]—N=N—$A_2$—N=N—[naphthyl with SO$_3$H]—NH—Z, $(SO_3H)_{0-1}$ and at least one yellow or orange dyeing dye of formula (3) $[(HO_3S)_{1-3}$—$B_1$—N=]—[=N—phenyl$(SO_3H)_{0-2}$—NH—Z$(B_2)_{1-3}$]

or (4) [pyridone with $R_1$, $R_2$, $R_3$, OH, O]—N=N—[phenyl$(R_4)_{1-2}$]—NH—Z and at least one blue dyeing dye of formula (5) [Cu complex with $(CO)_q$—O, phenyl groups, N=N, C-phenyl]—$(SO_3H)_{1-4}$, —NH—Z, —$(X)_{1-2}$ or (6) $(T_1)_{1-2}$—[phenyl]—N=N—[naphthalene with NH$_2$, OH, HO$_3$S, SO$_3$H]—N=N—[phenyl$(T_2)_{0-2}$]—$T_3$ or (Abstract continued on next page.)

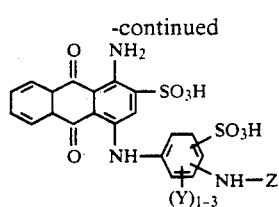
wherein $A_1$, $A_2$, $(B_2)_{1-3}$, $R_1$, $R_2$, $R_3$, $(R_4)_{1-2}$, $(X)_{1-2}$, $(T_1)_{1-2}$, $(T_2)_{1-2}$, $(Y)_{1-3}$ and Z in formulae (1) to (7) are as defined in claim 1.
The process of this invention is suitable for dyeing or printing cellulosic fibre materials.
33 Claims, No Drawings

PROCESS FOR DYEING OR PRINTING CELLULOSIC TEXTILE FIBRE MATERIAL BY THE TRICHROMATIC TECHNIQUE: REACTIVE DYES

The present invention relates to a process for dyeing or printing cellulosic textile fibre materials by the trichromatic dyeing technique with at least one red or reddish brown dyeing reactive dye, at least one yellow or orange dyeing reactive dye, and at least one blue dyeing reactive dye.

It is the object of the present invention to provide a process for dyeing or printing cellulosic textile fibre materials with reactive dyes suitable for combination by the trichromatic technique.

It has now been found that this object can be achieved by the process described in this invention. The dyeings and prints obtained meet the requirements made of them. In particular, the dyeings obtained are distinguished by uniform colour build-up, while at the same time having consistency of shade in different concentrations, and by their very good compatibility on the dyed material, and the prints are free from two-sidedness, i.e. the prints have consistency of shade.

Accordingly, the invention relates to a process for dyeing or printing cellulosic textile fibre materials by the trichromatic technique, which process comprises dyeing or printing said materials from an aqueous liquor with at least one red or reddish brown dyeing dye of formula

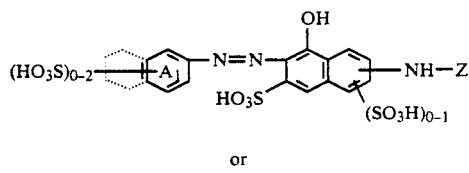

or

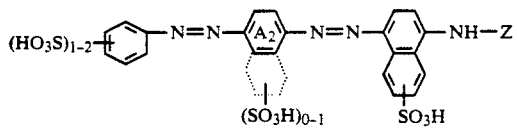

and at least one yellow or orange dyeing dye of formula

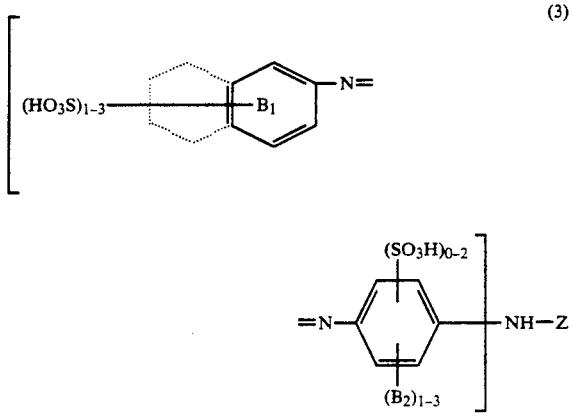

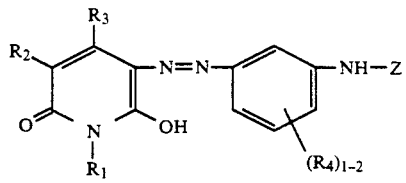

and at least one blue dyeing dye of formula

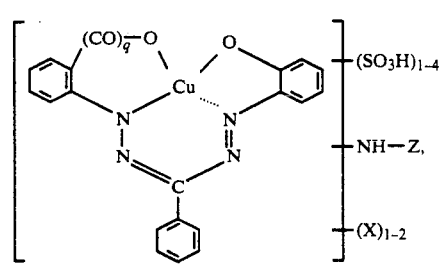

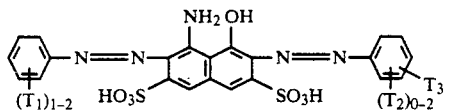

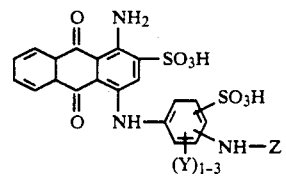

in which formulae (1), (2) and (3) above the benzene rings $A_1$, $A_2$ and $B_1$ may be further substituted, and the benzene rings $A_1$, $A_2$ and $B_1$, together with the fused benzene rings indicated in dashed outline, denote possible alternative naphthalene rings, $(B_2)_{1-3}$ denotes 1 to 3 substituents $B_2$, each independently of one another selected from the group consisting of hydrogen, $C_1$–$C_4$alkyl, $C_1$–$C_4$alkoxy, $C_2$–$C_4$alkanoylamino, halogen, nitro, cyano, trifluoromethyl, sulfamoyl, carbamoyl, amino, hydroxy, carboxy, sulfomethyl, sulfo or ureido, $R_1$ and $R_3$, each independently of the other, are hydrogen, $C_1$–$C_4$alkyl or phenyl, and $R_2$ is hydrogen, cyano, carbamoyl or sulfomethyl, $(R_4)_{1-2}$ denotes 1 to 2 substituents $R_4$, each independently of the other selected from the group consisting of hydrogen and sulfo, $(X)_{1-2}$ denotes 1 to 2 substituents X, each independently of the other selected from the group consisting of hydrogen, $C_1$–$C_4$alkyl, $C_1$–$C_4$alkoxy, halogen, $C_2$–$C_4$alkanoylamino, hydroxy, carboxy, sulfo, cyano or nitro, q is 0 or 1, $(T_1)_{1-2}$ denotes 1 to 2 substituents $T_1$, each independently of the other selected from the group consisting of sulfo and —$SO_2$—Z′, where Z′ is β-sulfatoethyl, β-haloethyl or vinyl, $(T_2)_{1-2}$ denotes 1 to 2 substituents $T_2$, each independently of the other selected from the group consisting of hydrogen and sulfo, $T_3$ is the radical —NH—Z or —CONH—($CH_2$)$_{2-3}$—$SO_2$—Z′, and Z′ has the given meaning, $(Y)_{1-3}$ denotes 1 to 3 substituents Y, each independently of one another selected from the group consisting of hydrogen and $C_1$–$C_4$alkyl, and Z in formulae (1) to (7) is a 2-chloro-s-triazin-6-yl radical which contains in 4-position an unsubstituted or substituted amino group, or is a 2,4-difluoro-5-chloropyrimidin-6-yl radical.

By trichromatic dyeing is meant the additive blending of suitably chosen yellow or orange dyeing, red or reddish brown dyeing and blue dyeing reactive dyes with which almost every desired shade of the visible colour spectrum may be matched by appropriate choice of the quantity ratios.

The process of this invention is particularly distinguished by the excellent compatibility of the reactive dyes in continuous dyeing and printing processes, preferably in the processes known as the pad-dry-pad steam and pad thermofix processes, and also in the cold pad-batch process.

The dyeings obtained by the process of this invention exhibit neither tailing when padding nor migration problems when drying. The prints obtained by the process of this invention are distinguished by their excellent definition and by the non-occurrence of two-sidedness.

The benzene rings $A_1$, $A_2$ and $B_1$ may carry the customary substituents of azo dyes. Illustrative examples of such substituents are: alkyl groups of 1 to 8, preferably 1 to 4 carbon atoms such as methyl, ethyl, propyl, isopropyl, butyl, isobutyl, sec-butyl, tert-butyl, hexyl, and octyl, which alkyl groups may be substituted by sulfo; alkoxy groups of 1 to 8, preferably 1 to 4, carbon atoms such as methoxy, ethoxy, propoxy, isopropoxy, butoxy; acylamino groups such as alkanoylamino groups of 2 to 8 carbon atoms and alkoxycarbonylamino groups of 2 to 8 carbon atoms, for example acetylamino, propionylamino, methoxycarbonylamino or ethoxycarbonylamino; alkanoyl groups of 2 to 8, preferably 2 to 4, carbon atoms, such as acetyl, propionyl, butyryl or isobutyryl; $C_5$-$C_7$cycloalkylcarbonyl such as cyclohexylcarbonyl, $C_5$-$C_7$cycloalkylcarbonyl which is substituted in the cycloalkyl ring by $C_1$-$C_4$alkyl such as methyl, ethyl, propyl or butyl, or by halogen such as fluoro, chloro or bromo, or by sulfo or sulfato; benzoyl or benzoyl which is substituted in the phenylring by $C_1$-$C_4$alkyl such as methyl, ethyl, propyl or butyl, or by halogen such as fluoro, chloro or bromo, or by sulfo or sulfato; benzoylamino, amino, mono- or dialkylamino containing 1 to 8 carbon atoms in the alkyl moiety or moieties, phenylamino; alkoxycarbonyl containing 1 to 8 carbon atoms in the alkoxy moiety; $C_5$-$C_7$cycloalkylaminosulfonyl, nitro, cyano, trifluoromethyl, halogen such as fluoro, bromo or, preferably, chloro, sulfamoyl, sulfamoyl which is substituted at the nitrogen atom by one or two members selected from the group consisting of $C_1$-$C_4$alkyl, $C_5$-$C_7$cycloalkyl and phenyl; carbamoyl, ureido, hydroxy, $C_1$-$C_8$alkylsulfonyl, $C_1$-$C_8$alkylaminosulfonyl, phenylsulfonyl which is substituted in the phenyl ring by $C_1$-$C_4$alkyl, halogen such as fluoro, chloro, bromo, or by sulfo or sulfato; carboxy, sulfomethyl, sulfo, sulfato, thiosulfato as well as phenyl, naphthyl, phenoxy, phenoxysulfonyl, phenylaminosulfonyl, which phenyl or naphthyl radicals may be further substituted by the cited substituents. In some cases, two adjacent substituents of the indicated ring systems may form a further fused phenyl ring, such a possible fused phenyl ring being indicated by the dashed lines in formulae (1), (2) and (3).

$C_1$-$C_4$Alkyl represented by $B_2$, $R_1$, $R_3$, X and Y in formulae (3), (4), (5) and (7) may suitably be: methyl, ethyl, propyl, isopropyl, butyl, isobutyl, sec-butyl or tert-butyl, and the corresponding radicals which are substituted by hydroxy, alkoxy of 1 to 4 carbon atoms, such as methoxy, ethoxy, propoxy, isopropoxy or butoxy, or by sulfo, sulfato, thiosulfato, cyano, or by halogen such as fluoro, chloro or bromo, and by phenyl, which phenyl radical may be further substituted by the substituents indicated above for $B_1$. Preferably the alkyl radicals $B_2$, $R_1$, $R_3$, X and Y are unsubstituted.

$B_2$ and X as halogen in formulae (3) and (5) are fluoro or bromo and, preferably, chloro.

$B_2$ and X as $C_{2-4}$alkanoylamino in formulae (3) and (5) may suitably be acetylamino, propionylamino or butyrylamino.

$B_2$ and X as alkoxy in formulae (3) and (5) may suitably be methoxy, ethoxy, propoxy, isopropoxy, butoxy, sec-butoxy, isobutoxy or tert-butoxy.

Amino groups which are in the 4-position of the 2-chloro-s-triazin-6-yl radical Z in formulae (1) to (7) may suitably be: —$NH_2$, alkylamino, N,N-dialkylamino, cycloalkylamino, N,N-dicycloalkylamino, aralkylamino, arylamino, mixed substituted amino groups such as N-alkyl-N-cyclohexylamino- and N-alkyl-N-arylamino groups, and also amino groups which contain heterocyclic radicals which may contain further fused carbocyclic rings, and amino groups in which the amino nitrogen atom is a member of a N-heterocyclic ring which may contain further hetero atoms. The above alkyl groups may be straight-chain or branched, low molecular or higher molecular, alkyl groups of 1 to 6 carbon atoms being preferred. Particularly suitable cycloalkyl, aralkyl and aryl radicals are cyclohexyl, benzyl, phenethyl, phenyl and naphthyl radicals. Heterocyclic radicals are preferably furan, thiophene, pyrazole, pyridine, pyrimidine, quinoline, benzimidazole, benzothiazole and benzoxazole radicals. And amino groups in which the amino nitrogen atom is a member of a N-heterocyclic ring are preferably radicals of six-membered N-heterocyclic compounds which may contain nitrogen, oxygen or sulfur as further hetero atoms. The above mentioned alkyl, cycloalkyl, aralkyl and aryl radicals, the heterocyclic radicals as well as the N-heterocyclic rings may be further substituted, for example by: halogen such as fluoro, chloro and bromo, nitro, cyano, trifluoromethyl, sulfamoyl, carbamoyl, $C_1$-$C_4$alkyl, $C_1$-$C_4$alkoxy, hydroxy-$C_1$-$C_4$alkoxy, $C_1$-$C_4$alkanoylamino groups such as acetylamino and benzoylamino, ureido, hydroxy, carboxy, sulfomethyl, sulfo or further fibre-reactive radicals. Illustrative examples of such amino groups are: —$NH_2$, methylamino, ethylamino, propylamino, isopropylamino, butylamino, hexylamino, β-methoxyethylamino, γ-methoxypropylamino, β-ethoxyethylamino, N,N-dimethylamino, N,N-diethylamino, β-chloroethylamino, β-cyanoethylamino, γ-cyanopropylamino, β-carboxyethylamino, sulfomethylamino, β-sulfoethylamino, β-hydroxyethylamino, N,N-di-β-hydroxyethylamino, γ-hydroxypropylamino, benzylamino, phenethylamino, cyclohexylamino, phenylamino, toluidino, xylidino, chloroanilino, anisidino, phenetidino, N-methyl-N-phenylamino, N-ethyl-N-phenylamino, N-β-hydroxyethyl-N-phenylamino, 2-, 3- or 4-sulfoanilino, 2,5-disulfoanilino, 4-sulfomethylanilino, N-sulfomethylanilino, 2-, 3- or 4-carboxyphenylamino, 2-carboxy-5-sulfophenylamino, 2-carboxy-4-sulfophenylamino, 4-sulfonaphth-1-yl-amino, 3,6-disulfonaphth-1-yl-amino, 3,6,8-trisulfonaphth-1-yl-amino, 4,6,8-trisulfonaphth-1-yl-amino, 1-sulfonaphth-2-yl-amino, 1,5-disulfonaphth-2-yl-amino, 6-sulfonaphth-2-ylamino, morpholino, piperidino and piperazino.

Exemplary of further suitable fibre-reactive radicals which are attached to the amino group in 4-position of the s-triazine are: a radical of formula

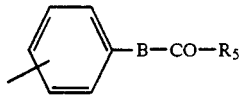 (8a)

wherein B is a direct bond or a radical $-(CH_2)_{n'}$ or $-O-(CH_2)_{n'}$; $n'=1, 2, 3, 4, 5$ or 6; $R_5$ is a radical of formula

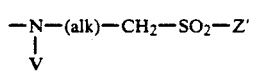 (8b)

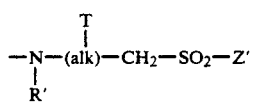 (8c)

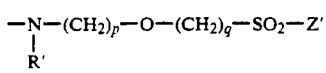 (8d)

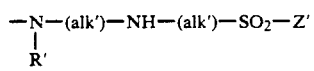 (8e)

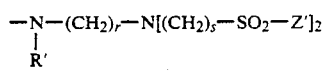 (8f)

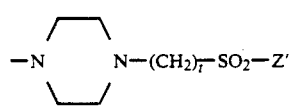 (8g)

wherein R' is hydrogen or $C_1-C_6$alkyl, alk is an alkylene radical of 1 to 7 carbon atoms, T is hydrogen, halogen, hydroxy, sulfato, carboxy, cyano, $C_1-C_4$alkanoyloxy, $C_1-C_4$alkoxycarbonyl, carbamoyl or a radical $-SO_2-Z'$, V is hydrogen, unsubstituted or substituted $C_1-C_4$alkyl or a radical of formula

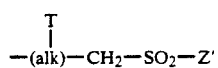 (8h)

wherein (alk) is as defined above, each alk' is independently of the other polymethylene of 2 to 6 carbon atoms, Z' has the given meaning, p, q, r and t are each independently of one another 1, 2, 3, 4, 5 or 6, and s is 2, 3, 4, 5 or 6; or a radical of formula

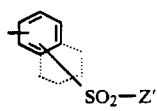 (9)

wherein the benzene or naphthalene ring may contain further substituents, for example the substituents cited in connection with the benzene rings $A_1$, $A_2$ and $B_1$, and wherein Z' has the given meaning; or wherein the amino group in 4-position, together with a fibre-reactive radical, is a radical of formulae (8b) to (8g).

The radical B contains 1 to 6, preferably 1 to 4, carbon atoms. Exemplary of B are: methylene, ethylene, propylene, butylene, methyleneoxy, ethyleneoxy, propyleneoxy and butyleneoxy. If B is a radical $-O-(CH_2)_{n'}$, B is attached to the benzene ring through the oxygen atom. Preferably B is a direct bond.

If T is a $-SO_2-Z'$ radical and R' is hydrogen, then the radical of formula (8c) preferably has the formula

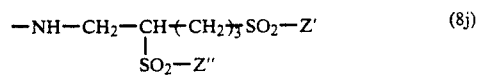 (8i)

wherein Z' and Z'' are each independently of the other β-sulfatoethyl, β-haloethyl or vinyl. An important variant formula of this radical is

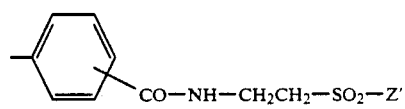 (8j)

wherein Z'=Z'', where Z' and Z'' are as defined above. Z' and Z'' are preferably β-sulfatoethyl, β-chloroethyl or vinyl.

Z' and Z'' as β-haloethyl are preferably β-chloroethyl.

A preferred radical of formula (8a) has the formula

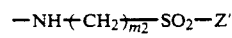

A preferred radical of formula (8b) to (8g) has the formula

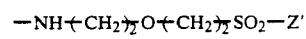

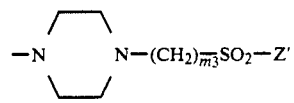

or

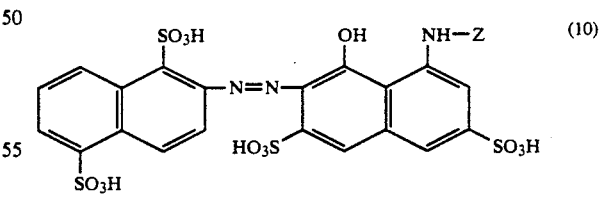

wherein $m_2$ and $m_3=2, 3, 4, 5$ or 6, preferably 2 or 3, and Z' is vinyl, β-chloroethyl or β-sulfatoethyl.

Preferred embodiments of the process of this invention comprise a) using as dye of formula (1) a dye of formula

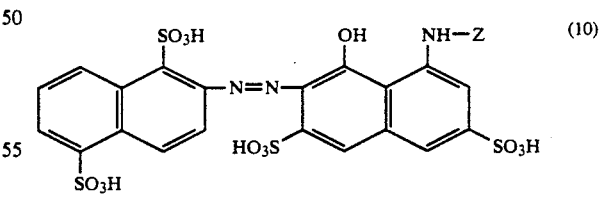 (10)

or

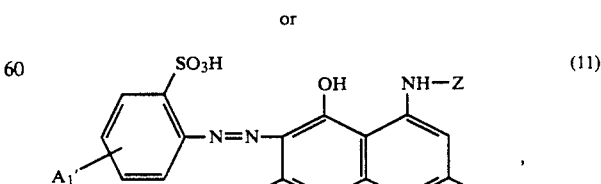 (11)

wherein Z is as defined above, and $A_1'$ is hydrogen, $C_1-C_4$alkyl, $C_1-C_4$alkoxy, halogen or $C_2-C_4$alkanoylamino, together with a dye of formulae (3) or (4) and (5), (6) or (7); or b) using as dye of formula (2) a dye of formula

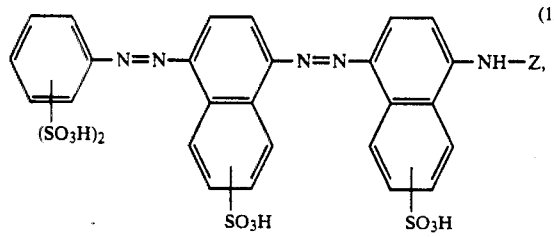 (12)

wherein Z is as defined above, together with a dye of formulae (3) or (4) and (5), (6) or (7); or c) using as dye of formula (3) a dye of formula

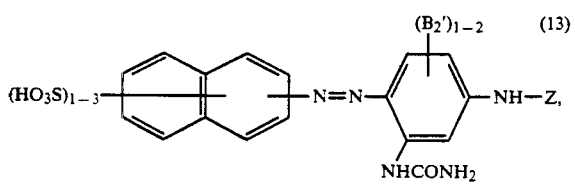 (13)

wherein $(B_2')_{1-2}$ denotes 1 to 2 substituents $B_2'$, each independently selected from the group consisting of hydrogen, halogen, nitro, cyano, trifluoromethyl, sulfamoyl, carbamoyl, $C_{1-4}$alkyl, $C_{1-4}$alkoxy, amino, acetylamino, ureido, hydroxy, carboxy, sulfomethyl and sulfo, and Z is as defined above, together with a dye of formula (1) or (2) and (5), (6) or (7); or d) using as dye of formula (5) a dye of formula

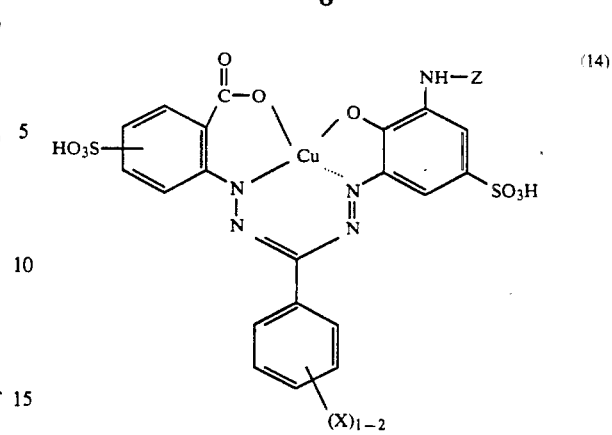 (14)

wherein $(X)_{1-2}$ denotes 1 to 2 substituents X, each independently selected from the group consisting of hydrogen, halogen, $C_1-C_4$alkyl, $C_1-C_4$alkoxy, $C_2-C_4$alkanoylamino, hydroxy, carboxy and sulfo, and Z is as defined above, or a dye of formula

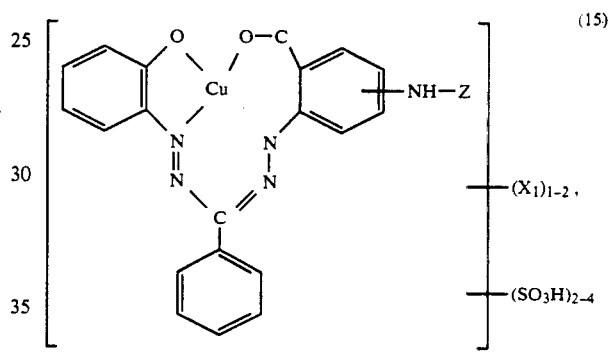 (15)

wherein $(X_1)_{1-2}$ denotes 1 to 2 substituents $X_1$, each independently selected from the group consisting of hydrogen, halogen, $C_1-C_4$alkyl, $C_1-C_4$alkoxy, $C_2-C_4$alkanoylamino, hydroxy and carboxy, and Z is as defined above, together with a dye formula (1) or (2) and (3) or (4); or e) using as dye of formula (6) a dye of formula

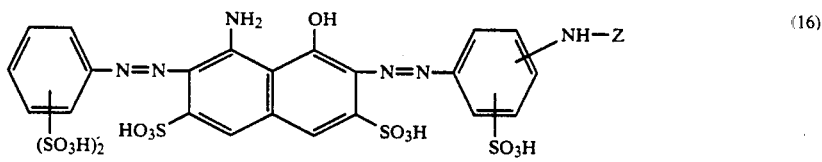 (16)

or

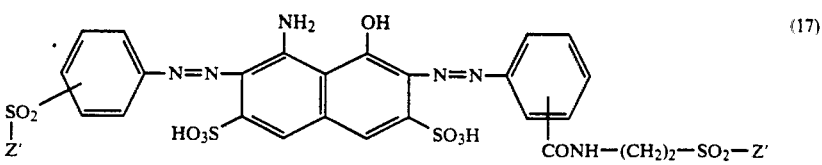 (17)

together with a dye of formula (1) or (2) and (3) or (4), wherein Z and Z' have the given meanings; or f) using as dye of formula (7) a dye of formula

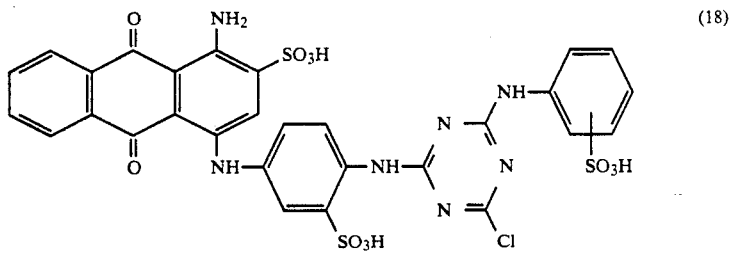

(18)

wherein the sulfo group in formula (18) may be in ortho-, meta- or para-position to the —NH group.

or

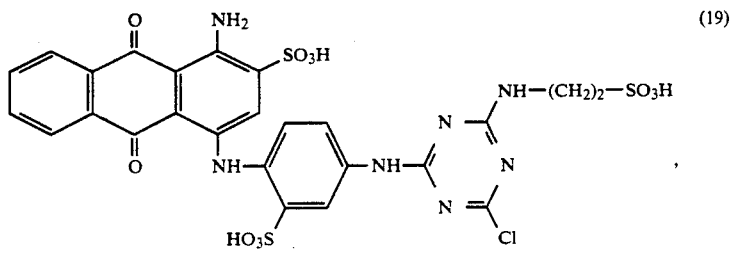

(19)

A particularly preferred embodiment of the process of this invention comprises using dyes of formulae (1) to (7) and (10) to (16), wherein Z is a radical of formula

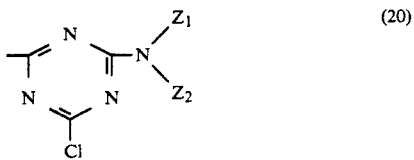

(20)

and $Z_1$ and $Z_2$ are each independently of the other hydrogen, unsubstituted or substituted $C_1$-$C_6$alkyl, unsubstituted or substituted $C_5$-$C_7$cycloalkyl or unsubstituted or substituted phenyl or naphthyl, preferably wherein $Z_1$ and $Z_2$ are each independently of the other hydrogen, $C_1$-$C_6$alkyl which may be substituted by hydroxy, $C_1$-$C_4$alkoxy, hydroxy-$C_1$-$C_4$alkoxy, halogen, sulfo, sulfato or a fibre-reactive radical, such as a radical as indicated under formulae (8a) and (9), $C_5$-$C_7$cycloalkyl which may be substituted by $C_1$-$C_4$alkyl, phenyl or naphthyl which may be substituted by $C_1$-$C_4$alkyl, $C_1$-$C_4$hydroxyalkyl, $C_1$-$C_4$alkoxy, halogen, $C_2$-$C_4$alkanoylamino, sulfo or a further fibre-reactive radical, such as a radical as indicated under formulae (8a) and (9), or wherein —N($Z_1$)$Z_2$ is a radical of formulae (8b) to (8g), or is morpholino, piperidino or piperazino.

A particularly preferred embodiment of the process of this invention comprises using as red or reddish brown dyeing dye a dye of formulae (10), (11) or (12), as yellow or orange dyeing dye a dye of formula (13), and as blue dyeing dye a dye of formulae (14), (15), (16) or (17).

Important embodiments of the process of this invention comprise f) using as dye of formula (10) a dye of formula

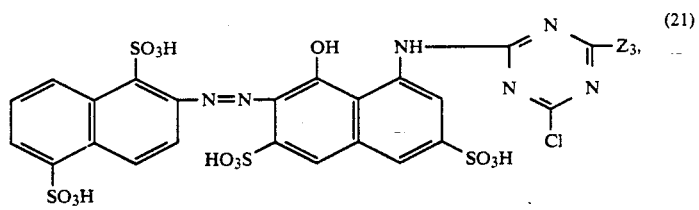

(21)

wherein $Z_3$ is morpholino, N-methylanilino, N-ethylanilino or —NH—(CH$_2$)$_2$—O—(CH$_2$)$_2$—SO$_2$—Z', where Z' is β-sulfatoethyl, β-chloroethyl or vinyl; or g) using as dye of formula (11) the dye of formula

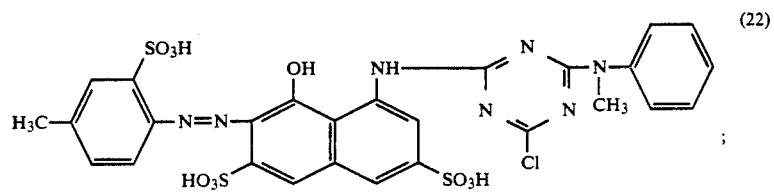

(22)

;

or h) using as dye of formula (12) a dye of formula

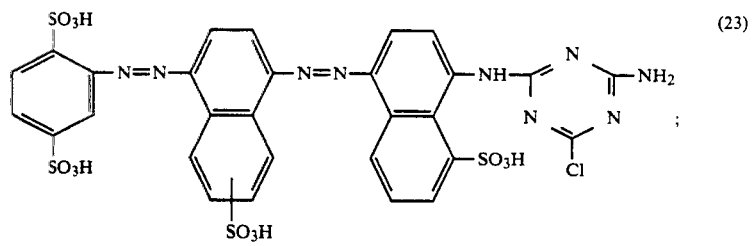
(23)
or
i) using as dye of formula (13) the dye of formula
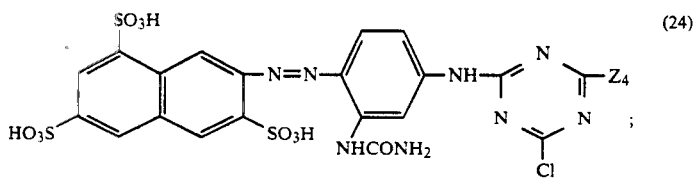
(24)
wherein $Z_4$ is β-sulfoethylamino, β-sulfatoethylamino, morpholino or $-NH-(CH_2)_2-O-(CH_2)_2-OH$; or
j) using as dye of formula (14) the dye of formula
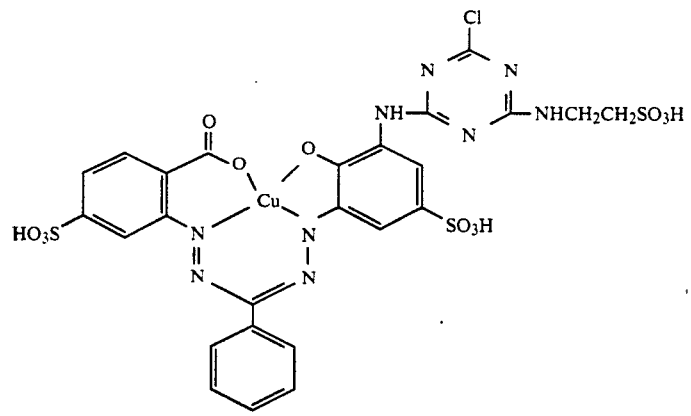
(25)
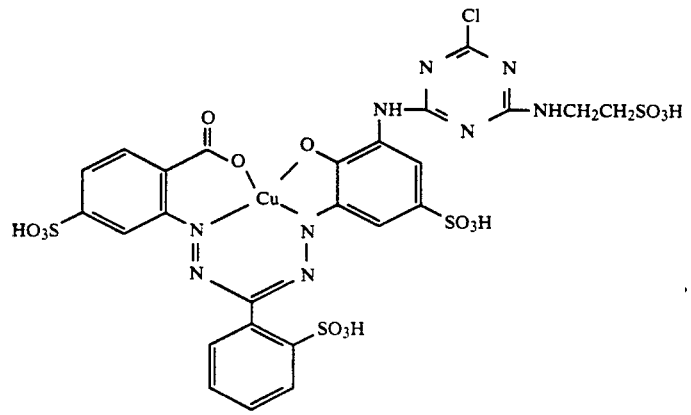
(26)

-continued
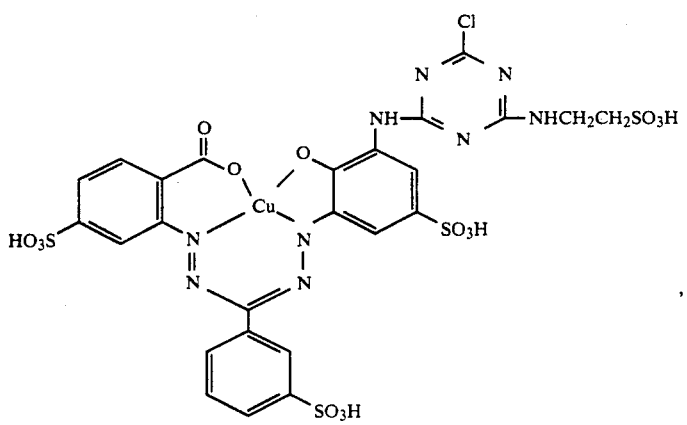
(27)
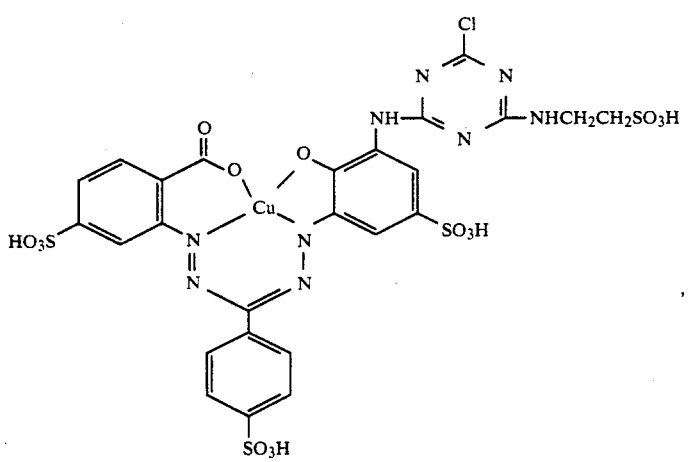
(28)
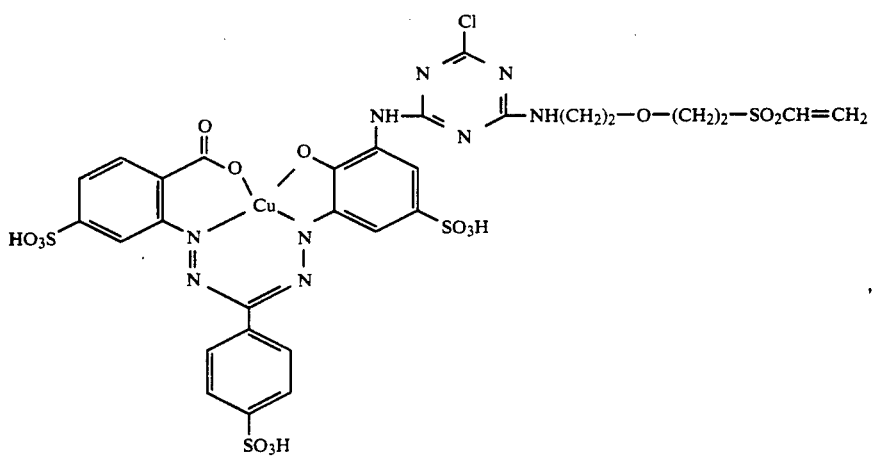
(29)

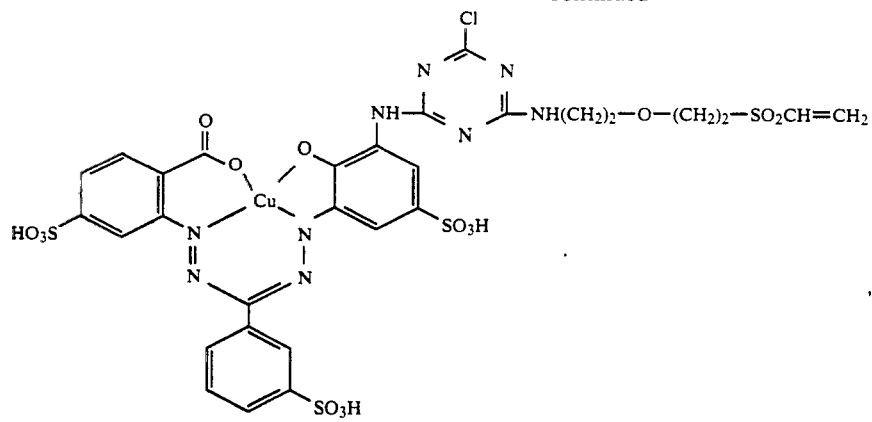
(30)
or
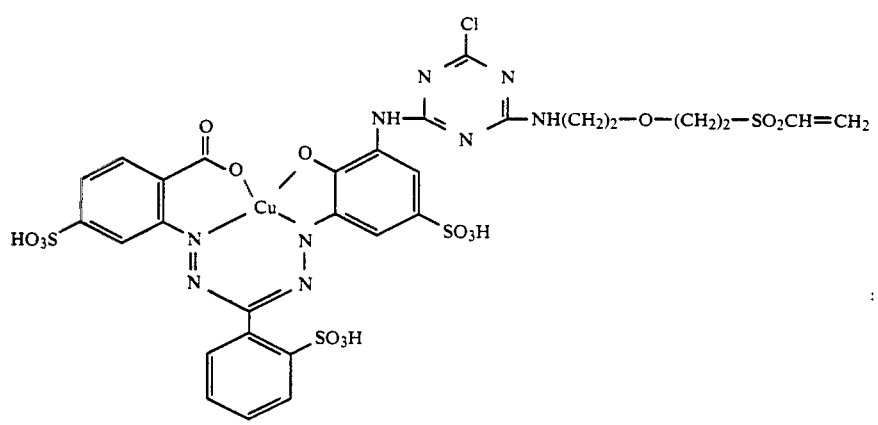
(31)
or
k) using as dye of formula (15) the dye of formula
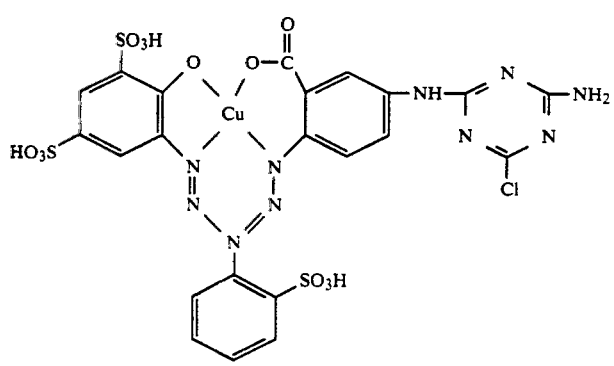
(32)
l) using as dye of formula (16) the dye of formula
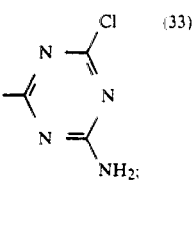
(33)
;
m) using as dye of formula (17) a dye of formula

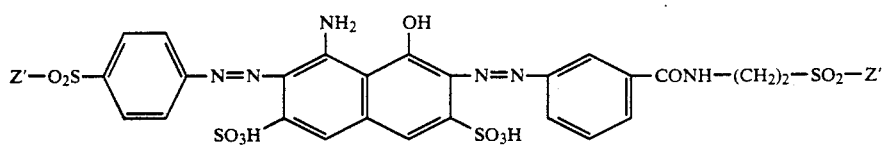

(34)

wherein Z' is β-sulfatoethyl, β-chloroethyl or vinyl.

A particularly important embodiment of the process of this invention comprises using a red or reddish brown dyeing dye of formula (21), (22) or (23), together with a yellow or orange dyeing dye of formula (24) and a blue dyeing dye of formula (25), (26), (27), (28), (29), (30), (31), (32), (33) or (34).

A quite especially important embodiment of the process of this invention comprises using one of the yellow dyeing dyes of formulae

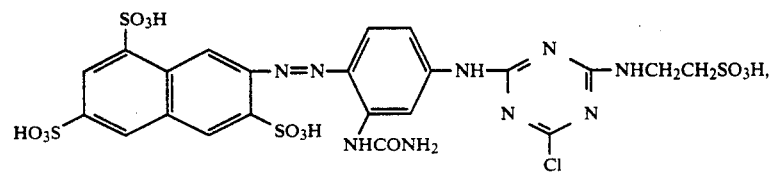

(36)

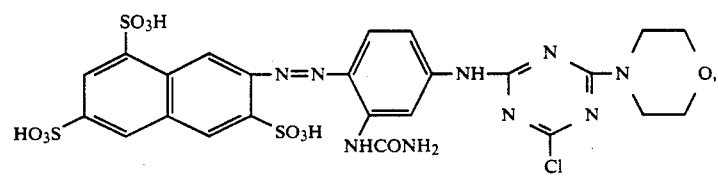

(37)

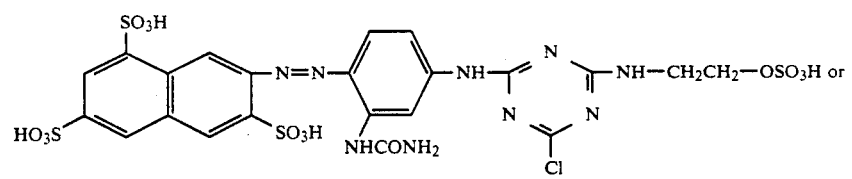

(38)

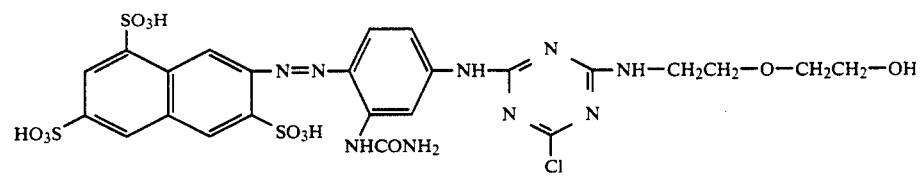

together with one of the red dyeing dyes of formulae

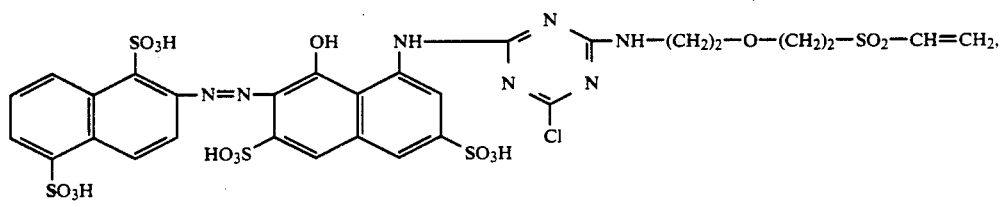

(39)

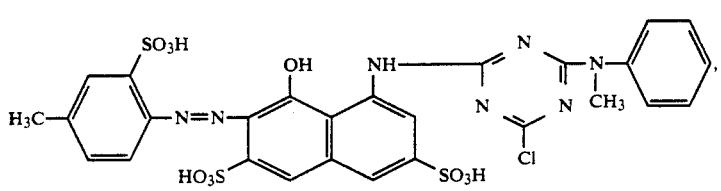

(22)

-continued
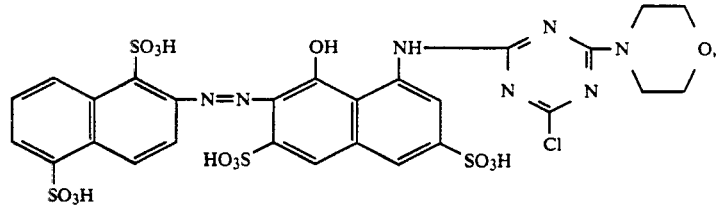
(40)
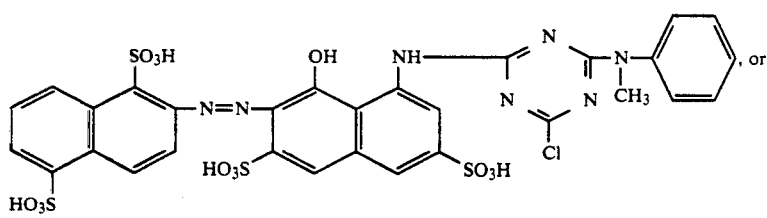
(41)
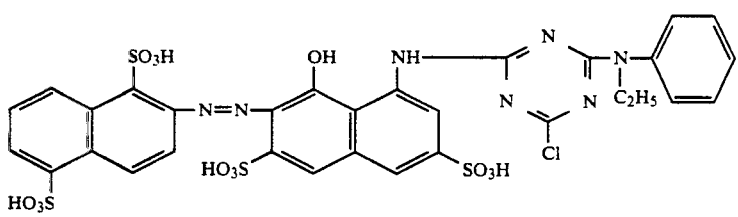
(42)
and the blue dyeing dye of formula
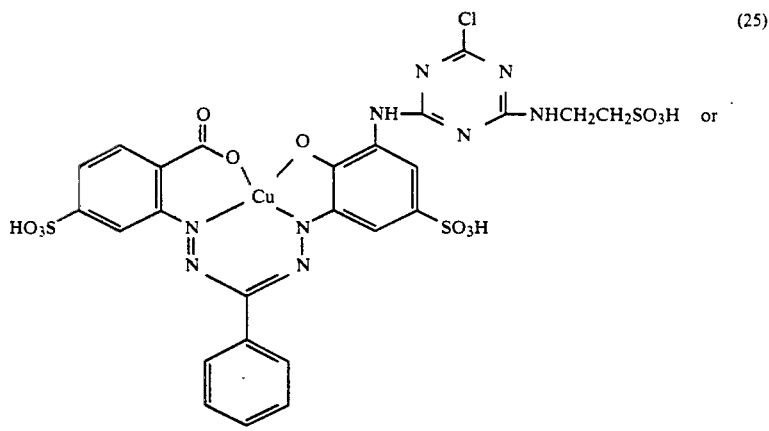
(25)
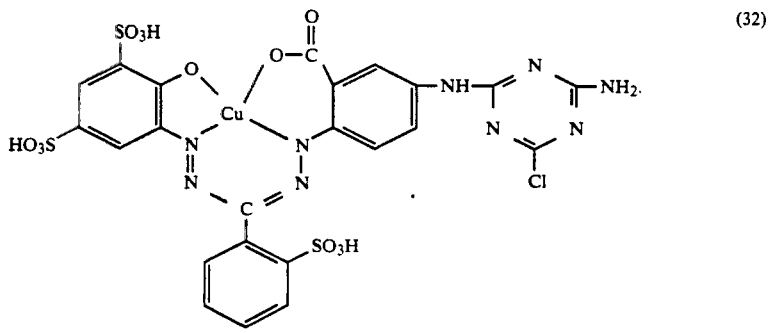
(32)
The most important embodiments of the process of this invention comprise using
n) a trichromatic mixture of the dyes of formulae

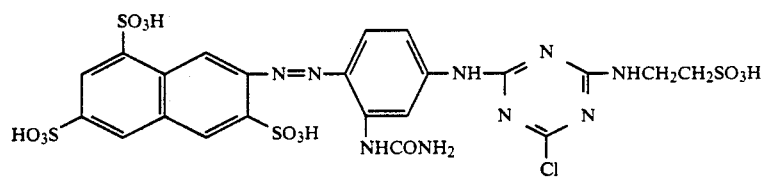
(35)
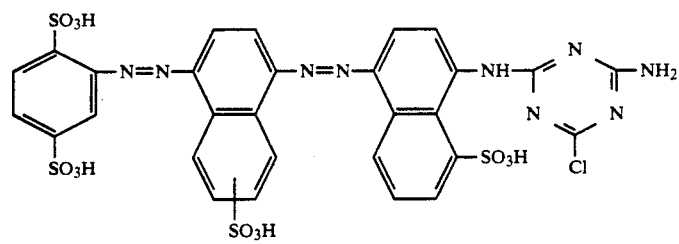
(23)
and
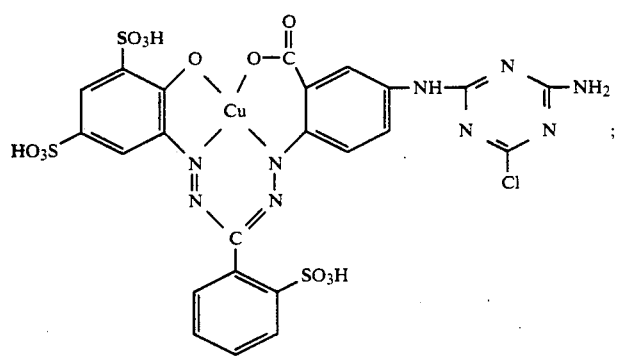
(32)
or
o) using a trichromatic mixture of the dyes of formulae
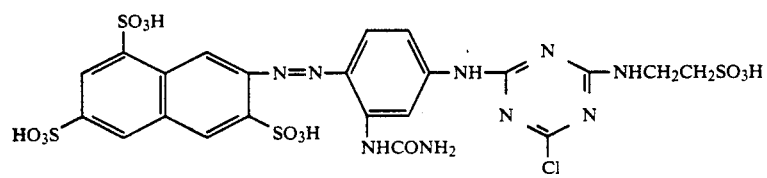
(35)
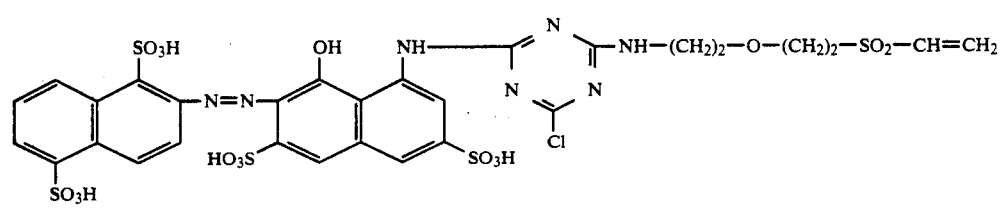
(39)
or
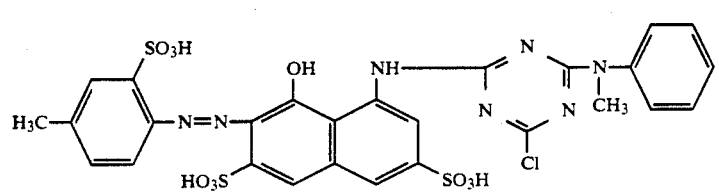
(22)
and

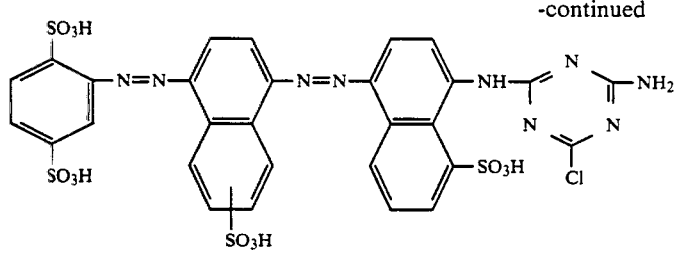

(23)

or

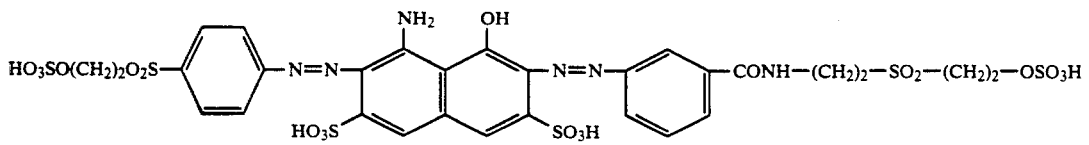

(43)

Dyeing in the process of this invention is carried out in aqueous medium. The procedure is such that the reactive dyes of the indicated formulae are applied in the temperature range from 15° to 100° C., preferably from 20° to 80° C., and fixed or thermofixed on the fibre material by steam in the presence of alkali. Alternatively the reactive dyes of the indicated formulae are applied in the temperature range from 15° to 100° C., preferably from 20° to 80° C., in the presence of alkali, and the dyed material is then stored in the temperature range from 10° to 40° C., preferably from 20° to 30° C., for 4 to 80 hours, preferably for 8 to 48 hours.

In the process of this invention, printing is carried out with an aqueous print paste. The procedure is, for example, such that a print paste comprising, in addition to one or more reactive dyes as indicated above, at least one alkaline compound such as $Na_2CO_3$, $NaHCO_3$, $CH_3COONa$, optionally a solubiliser such as urea, ε-caprolactam, dicyandiamide, a thickener, preferably an alginate such as sodium alginate, an emulsion or semi-emulsion, and optionally an oxidising agent such as the sodium salt of m-nitrobenzenesulfonic acid. The amount of fixing salt will depend on the nature and number of fibre-reactive radicals. An amount of 30 to 90 g, more particularly 50 to 70 g, has been found useful. The amount of solubiliser used is typically 0 to 200 g per kg of print paste. A 5% alginate thickener in an amount of ca. 500 g per kg of print paste has been found useful. The amount of oxidising agent is from 10 to 20 g per kg of print paste. After printing, the goods-as required. after first drying them-are steamed or thermofixed to fix the dyes on the fibre.

Dye fixation on cellulosic fibres is effected by conventional methods, in which the fixing time and fixing temperature will depend on the fibre material and the reactivity of the reactive dyes employed. To achieve a uniform and optimum dye fixation, steaming times in saturated steam of 3 to 15 minutes in the temperature range from 100° to 105° C. will normally suffice. Fixation is carried out by high temperature steaming or dry heat steaming for 20 seconds to 8 minutes at 105°-190° C. Preferably the reactive dyes are fixed with steam in the temperature range from 100° to 150° C. for 30 seconds to 12 minutes, preferably for 2 to 10 minutes.

The prints are finished by rinsing them with hot and-/or cold water and, if necessary, by subsequent washing in the presence of a commercial detergent, then rinsing with water and drying.

The process of this invention is used for producing dyeings and prints on cellulosic fibre materials. Typical examples of suitable cellulosic fibre materials are natural cellulose fibres such as cotton, linen and hemp, as well as cellulose and regenerated cellulose.

The process of this invention comprises impregnating or padding the fibre material with a dye solution or suspension to a liquor pick-up of 50 to 120 percent by weight, preferably of 50 to 80 percent by weight. In addition to containing the colouring component, the padding liquor may already contain the requisite amount of fixing alkali. In the pad-dry-pad steam and pad thermofix processes, the padding liquor will preferably not contain fixing alkali. After application of the dye component, the material can be given an aftertreatment by drying it to a residual moisture content of ca. 5 to 20, preferably 5 to 15, percent by weight, and the goods can then be impregnated with a liquor which contains the fixing alkali and fixation is subsequently effected by steaming the goods.

A further embodiment of the dyeing process of the invention comprises impregnating the fibre material with a dye solution or suspension which already contains the fixing alkali and further optional components, then drying the goods and thermofixing them in the temperature range from 110° to 220° C. The thermofixation time will depend on the thermofixing temperature, i.e. the higher the temperature the shorter the time can be. A thermofixation time of 2 to 4 minutes has proved convenient for the temperature range from 110° to 140° C. A thermofixation time of 20 to 90 seconds has proved convenient for the temperature range from 160° to 220° C.

A further embodiment of the process of this invention for dyeing comprises impregnating the fibre material with a dye solution or suspension which already contains the fixing alkali and further optional components, then packing the goods airtight in plastic bags and storing them in the temperature range from 10° to 40° C., preferably from 20° to 30° C., for 4 to 80 hours, preferably for 8 to 48 hours. Which temperature range is most advantageous will depend on the material, on the type of reactive dye, and on the desired tinctorial strength.

Preferred embodiments of the process of the invention comprise impregnating the fibre material with a dye solution or suspension, then impregnating the dyed material with a solution of fixing alkali and thereafter steaming the goods; or impregnating the fibre material with a liquor which contains the dye solution or suspension and the fixing alkali, and then steaming or thermofixing the dyed goods; or impregnating the fibre material with a dye solution or suspension, drying the dyed material, then impregnating the dried goods with a solution which contains the fixing alkali and subsequently steaming the goods; or impregnating the fibre material with a dye solution or suspension in the presence of a fixing alkali, and then packing the goods airtight and storing them.

A particularly preferred embodiment of the process of the invention for dyeing comprises impregnating the fibre material with a liquor which contains a dye solution or suspension to a pick-up of 50-80 percent by weight, then drying the goods to a residual moisture content of 5 to 15 percent by weight in the temperature range of, for example, 70° to 150° C., thereafter impregnating the goods with a liquor which contains the fixing alkali to a pick-up of 50-80 percent by weight, and subsequently steaming the goods.

The liquor to goods ratio of the padding liquor with which the reactive dyes of the indicated formulae are applied to the fibre material is preferably 1:0.5 to 1:1.2, most preferably 1:0.5 to 1:0.8. The liquor is applied in the temperature range from 15° to 100° C., preferably from 20° to 80° C., and, most preferably, from 20° to 30° C.

Suitable fixing alkalies which may be used in the process of this invention for dyeing or printing are alkali metal hydroxides such as NaOH, KOH and LiOH, alkali metal carbonates such as sodium carbonate and potassium carbonate, and alkali metal hydrogencarbonates such as sodium hydrogencarbonate and potassium hydrogencarbonate, as well as alkali metal phosphates such as trisodium phosphate and disodium phosphate, without or together with neutral salts such as sodium chloride.

Cotton has proved especially suitable as fibre material.

If the fixing alkali is applied to the goods together with the colouring component, the pH of the liquor will be in the range from 8.5 to 14.

If the fixing alkali is applied with a separate liquor to the goods, the pH of this liquor will be in the range from 8.5 to 14.

In the process of this invention, superheated steam fixation in the temperature range from 100° to 220° C., preferably from 100° to 105° C. or from 150° to 190° C., based on a pressure of 1 bar, has proved convenient.

Where the process of this invention takes the form of the cold pad-batch process, a temperature range from 10° to 40° C., preferably from 20° to 30° C., for 8 to 80 hours, preferably for 8 to 48 hours, has proved convenient.

Fixation is most preferably carried out by the pad-dry-pad steam process with saturated steam in the temperature range from 100° to 105° C.

The steaming time is 30 seconds to 20 minutes, preferably 60 seconds to 3 minutes.

Depending on the desired depth of shade of the dyeing, the dyes are used in amount of 0.1 to 10%.

After fixation, the dyeings are rinsed thoroughly with cold and hot water, with or without the addition of an agent which acts as a dispersant and promotes the diffusion of unfixed dye.

A preferred embodiment of the process of this invention comprises washing off the dyed goods with an aqueous wash liquor at a pH in the range from 8.5 to 9 and at elevated temperature, preferably in the range from 70° to 85° C., in the absence or presence of a nonionic detergent.

The dyeings obtained with the reactive dyes used in the process of this invention are distinguished by very good compatibility on the fibre material. High fixation rates and a very good build-up are obtained, and the dyeings have good allround fastness properties, especially good lightfastness and very good wetfastness properties. Neither tailing nor migration problems occur in the process of this invention. The prints obtained with the reactive dyes used in the process of the invention have excellent definition and, in addition, they are free from two-sidedness.

The dye liquors may contain the customary ingredients, for example aqueous solutions of inorganic salts, for example of alkali metal chlorides or alkali metal sulfates, urea, thickeners such as alginate thickeners, water-soluble cellulose alkyl ethers as well as dispersants, levelling agents and migration inhibitors, and also sodium m-nitrobenzenesulfonate and, as additional thickeners, methyl cellulose, starch ethers, emulsion thickeners, preferably an alginate such as sodium alginate, and wetting agents.

The dyes used in the process of the invention are either in the form of the free acid or, preferably, as salts thereof.

Illustrative of suitable salts are the alkali metal, alkaline earth metal or ammonium salts of an organic amine. Typical examples are the sodium. lithium, potassium or ammonium salts or the salt of triethanolamine.

The invention further relates to the mixtures of dyes of formulae (1) or (2), (3) or (4) and (5), (6) or (7) and to the preferred mixtures.

The invention is illustrated by the following Examples in which parts and percentages are by weight. The relationship between parts by weight and parts by volume is the same as that between the gram and the cubic centimetre. Dye concentrations refer to commercial dye.

EXAMPLE 1

Bleached cotton cretonne is impregnated on the pad to a pick-up of 70% with a padding liquor of the following composition:
1.0 g of the yellow dyeing dye of formula

(101)

perature range from 100° to 105° C.

0.2 g/l of the red dyeing dye of formula

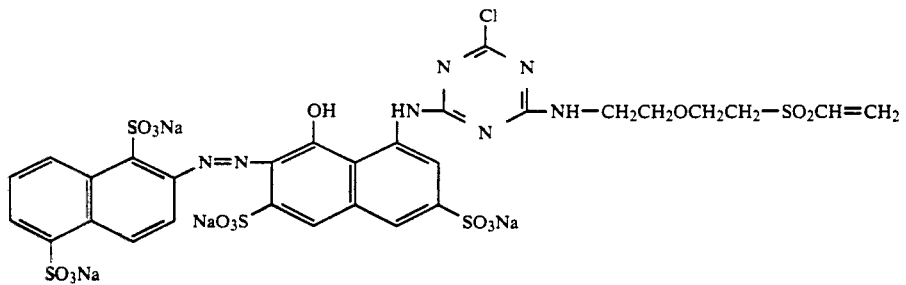
(102)

0.5 g/l of the blue dyeing dye of formula

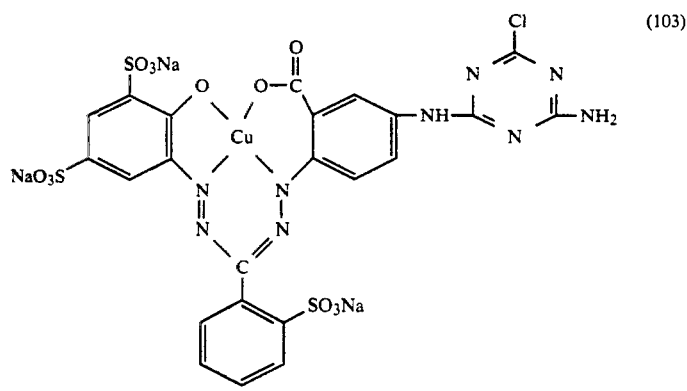
(103)

10 g/l of calcined sodium sulfate, and
1 g/l of a wetting agent.

The immersion time is 2 seconds.

After padding, the cotton cretonne is dried for 1 minute at 100° C., padded with a liquor containing 250 g/l of NaCl and 40 ml/l of 30% NaOH to a pick-up of ca. 80% and then fixed for 1 minute in saturated steam at 101° to 103° C.

The cotton cretonne is afterwards rinsed first with cold water and then with hot to boiling water, soaped at the boil with 1 to 2 g/l of a detergent, rinsed once more with hot and then with cold water, and thereafter dried.

A level olive dyeing of good fastness properties and free from ending is obtained.

EXAMPLE 2

Bleached mercerised cotton is impregnated on the pad to a pick-up of 70% with a padding liquor of the following composition:

1.0 g/l of the yellow dyeing dye of formula

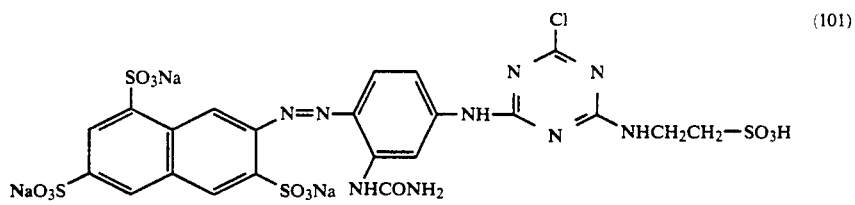
(101)

0.5 g/l of the red dyeing dye of formula

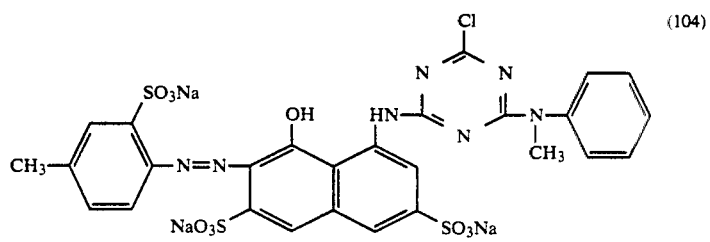
(104)

0.5 g/l of the blue dyeing dye of formula

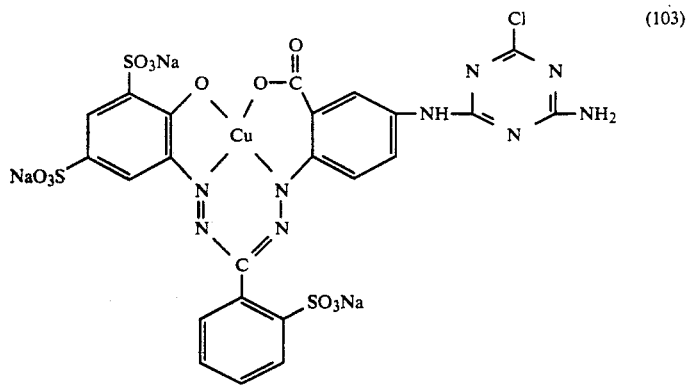
(103)

50 g/l of urea
20 g/l of calcined sodium carbonate, and
1 g/l of a wetting agent.

The immersion time is 2 seconds.

The padded material is dried on the hot flue for 1 minute at 100° C. and then thermofixed for 1 minute at 180° C. on the hot flue.

The goods are rinsed, soaped, rinsed once more and dried as described in Example 1, to give a a beige dyeing of good fastness properties and free from ending on the cotton cretonne.

Level dyeings of good fastness properties and free from ending are also obtained by using in place of the yellow dyeing dye of formula (101) an equivalent amount of one of the following dyes (105) to (107), and in place of the red dyeing dyes of formulae (102) to (104) an equivalent amount of a dye of formulae (108) to (111), and in place of the blue dyeing dye of formulae (103) an equivalent amount of a dye of formulae (112) to (120).

TABLE yellow or orange dyeing dyes

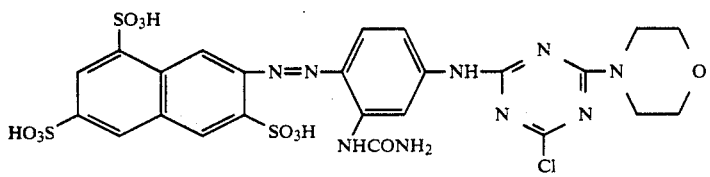
(105)

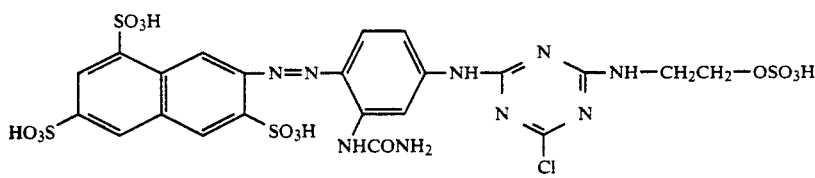
(106)

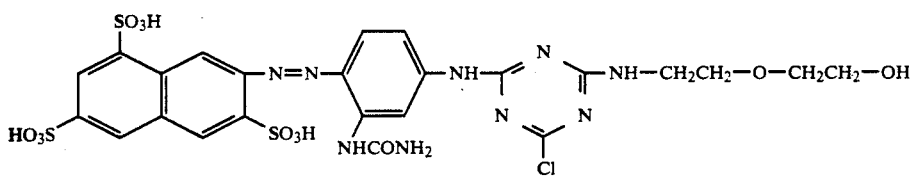
(107)

red or reddish brown dyeing dyes

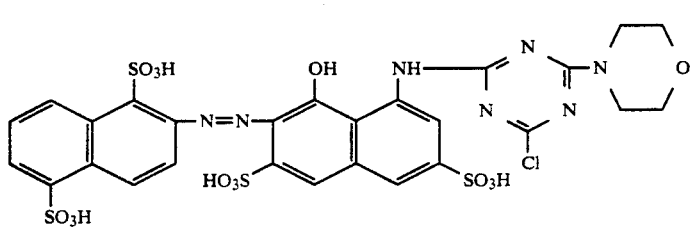
(108)

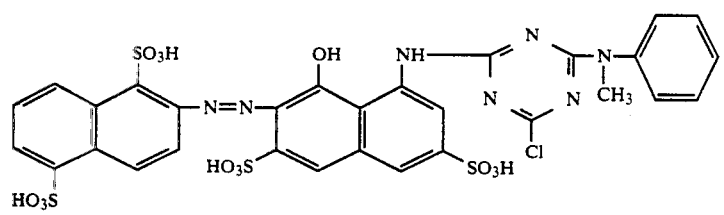
(109)
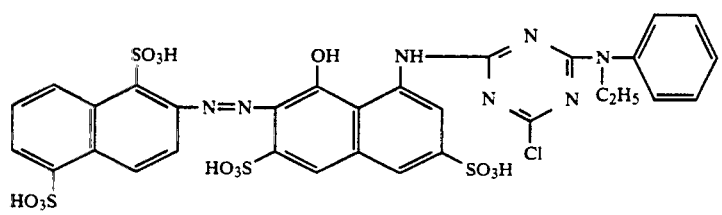
(110)
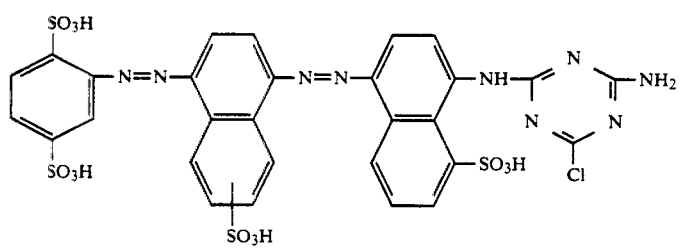
(111)
blue dyeing dyes
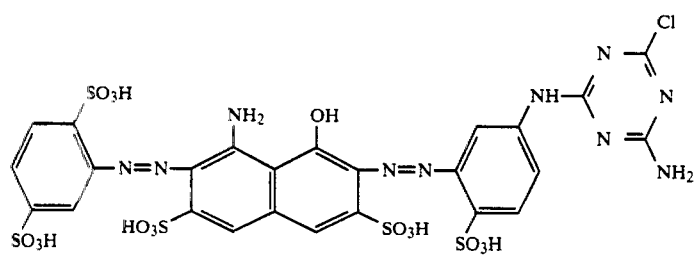
(112)
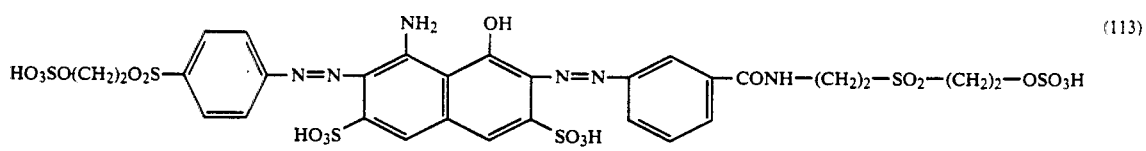
(113)
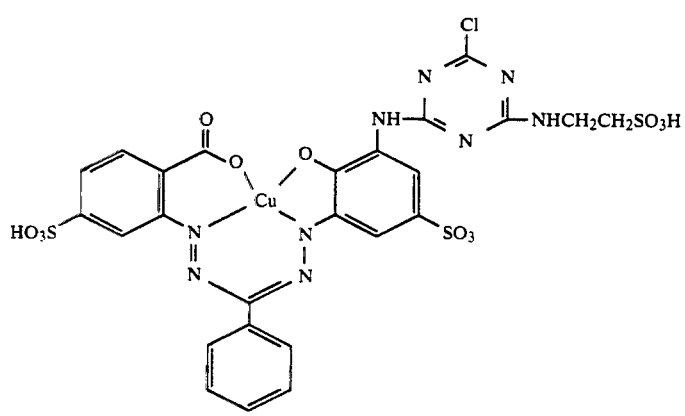
(114)

TABLE-continued
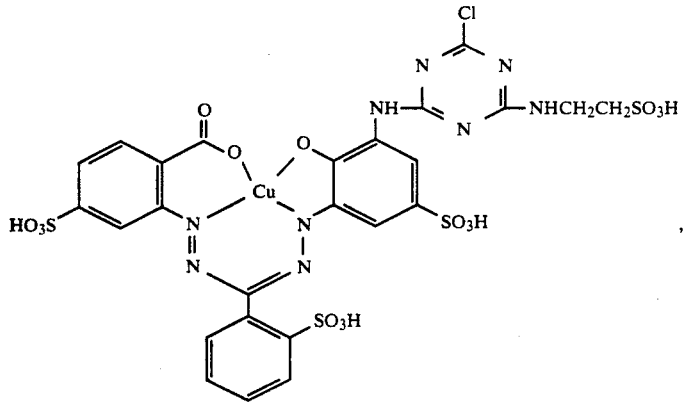
(115)
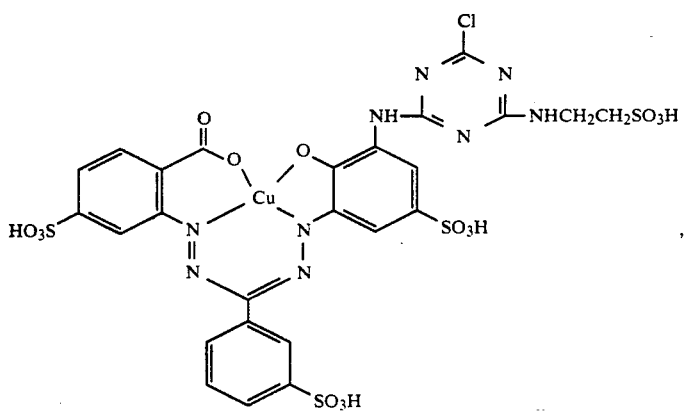
(116)
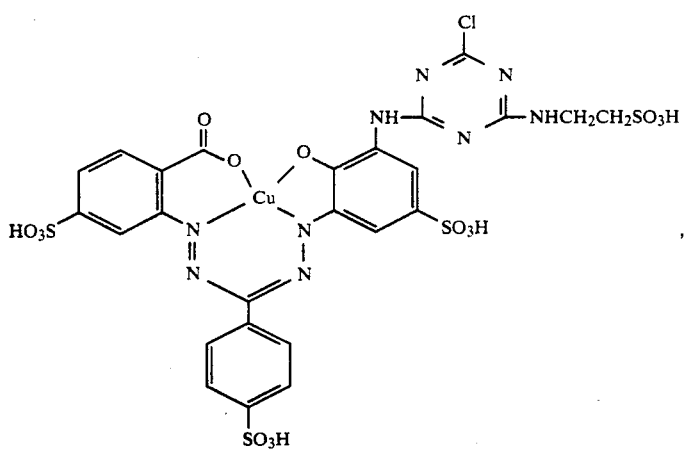
(117)
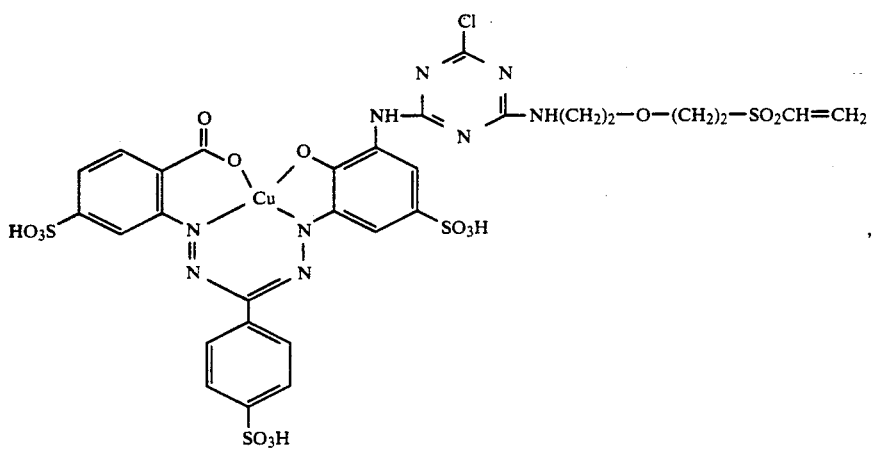
(118)

TABLE-continued
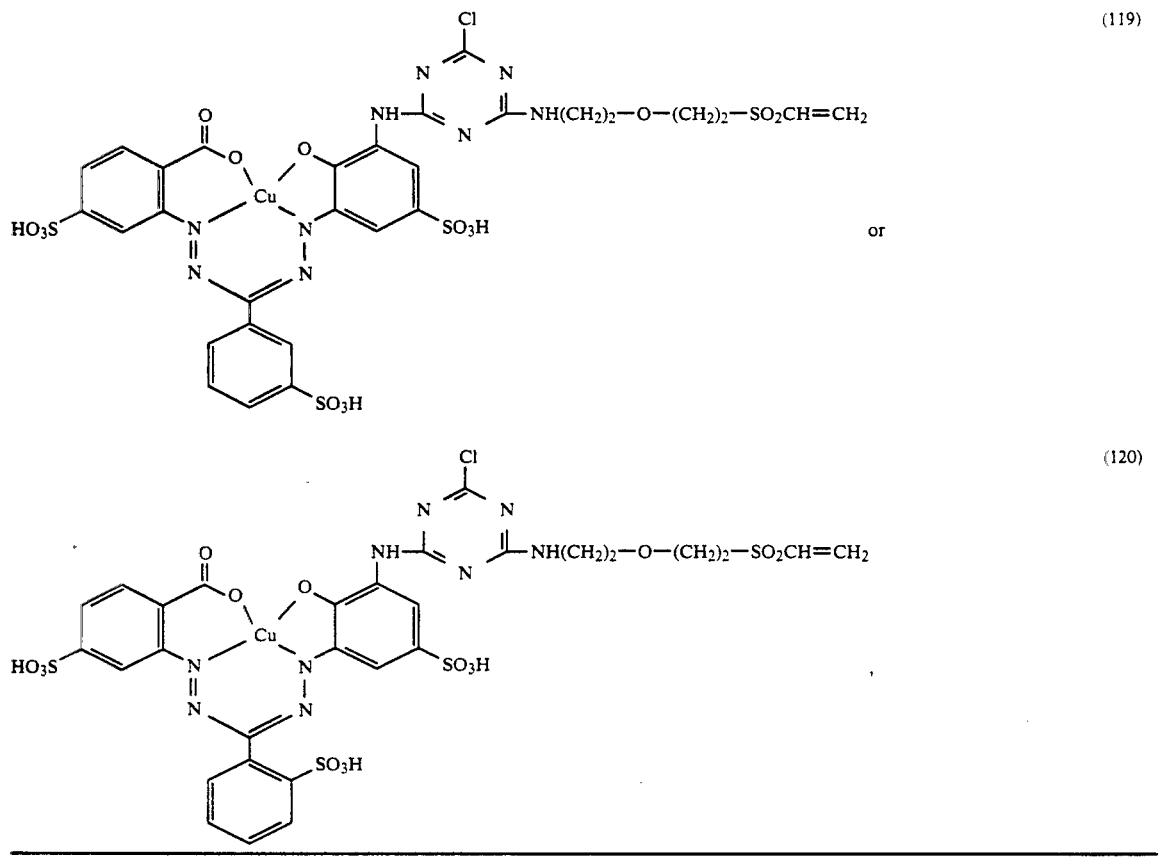
EXAMPLE 3
Bleached mercerised cotton cretonne is impregnated on the pad to a pick-up of 70% with a padding liquor of the following composition:
1.0 g/l of the yellow dyeing dye of formula
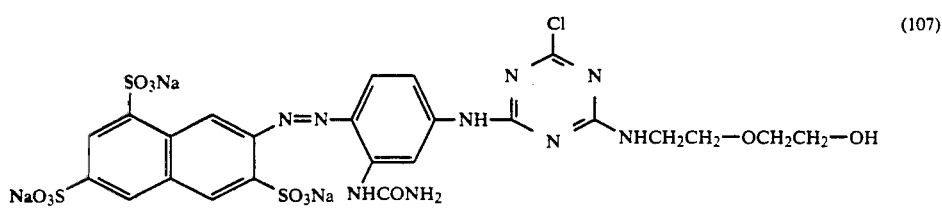
0.5 g/l of the red dyeing dye of formula
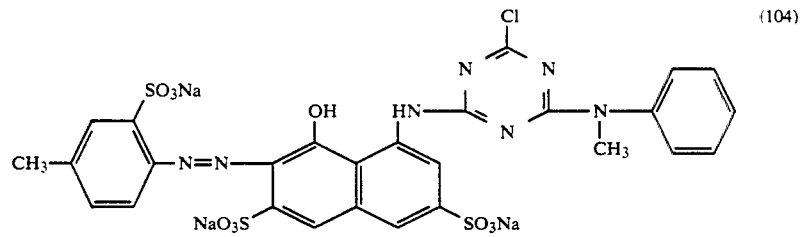
0.5 g/l of the blue dyeing dye of formula

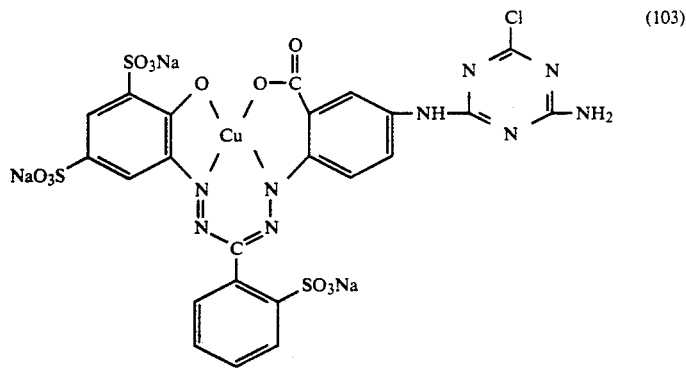
(103)

30 g/l of aqueous sodium hydroxide (30%) and 1 g/l of a wetting agent.

The immersion time is 2 seconds.

The padded fabric is packed airtight in plastic bags and stored for 24 hours at 25° C.

The cotton cretonne is rinsed first with cold water and then with hot boiling water, soaped at the boil with 1 to 2 g/l of a detergent, rinsed once more with hot and then with cold water and subsequently dried.

A level beige dyeing of good fastness properties and free from ending is obtained.

Level dyeings of good fastness properties and free from ending are also obtained by using in place of the yellow dyeing dye of formula (107) an equivalent amount of one of the following dyes (101), (105) or (106), and in place of red dyeing dye of formula (104) an equivalent amount of a dye of formulae (108) to (111), and in place of the blue dyeing dye of formula (103) an equivalent amount of a dye of formulae (112) to (122).

TABLE yellow or orange dyeing dyes

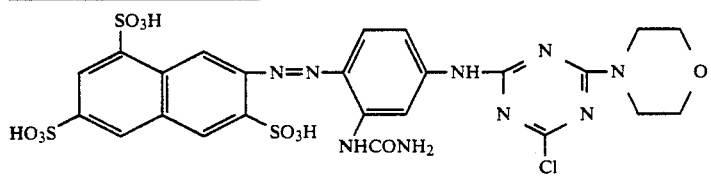
(105)

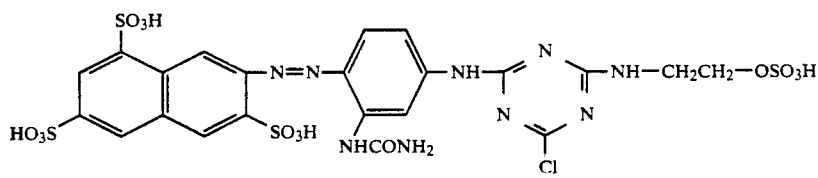
(106)

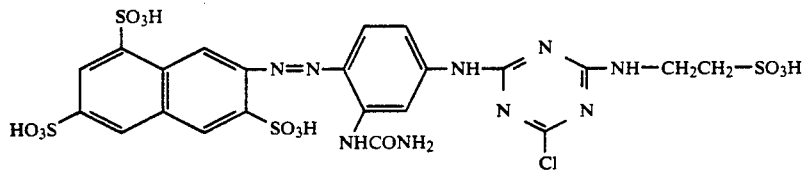
(101)

red or reddish brown dyeing dyes

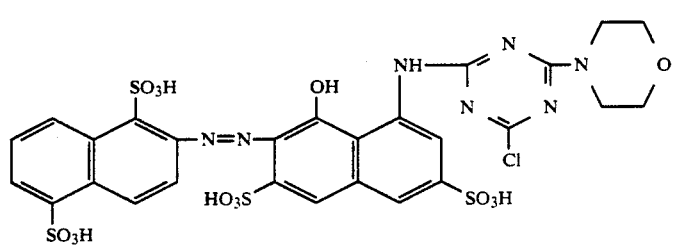
(108)

TABLE-continued
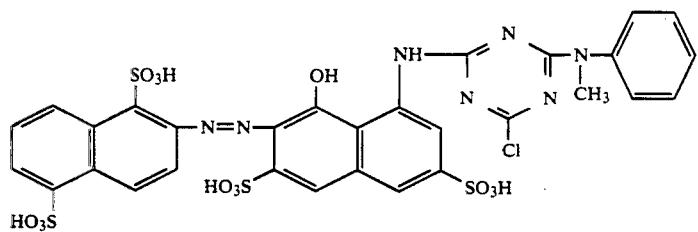
(109)
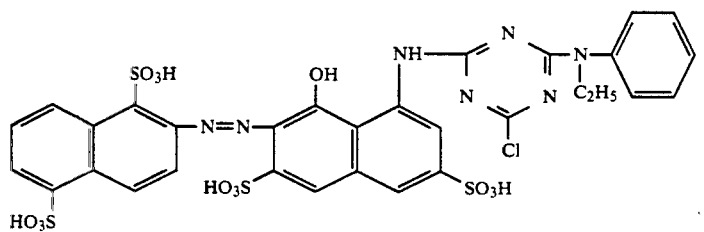
(110)
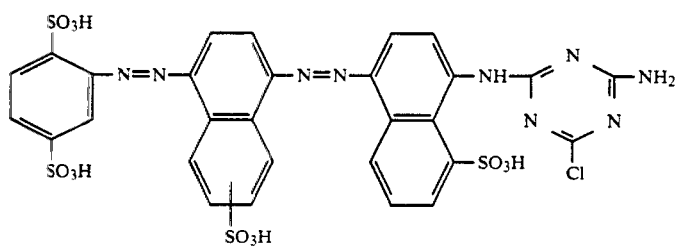
(111)
blue dyeing dyes
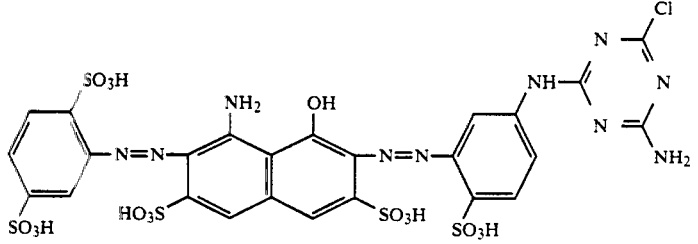
(112)
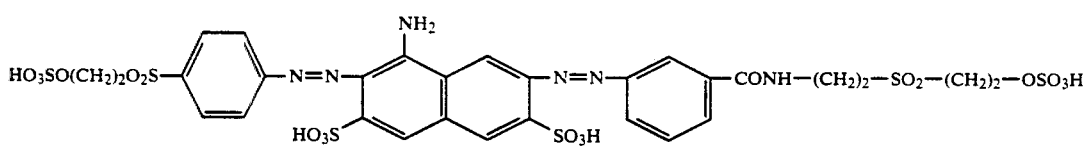
(113)
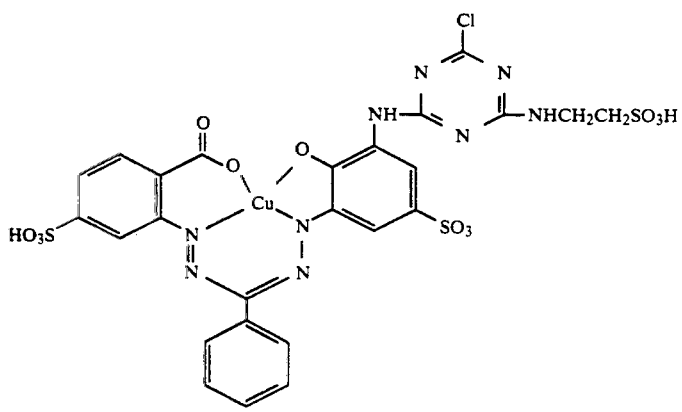
(114)

TABLE-continued
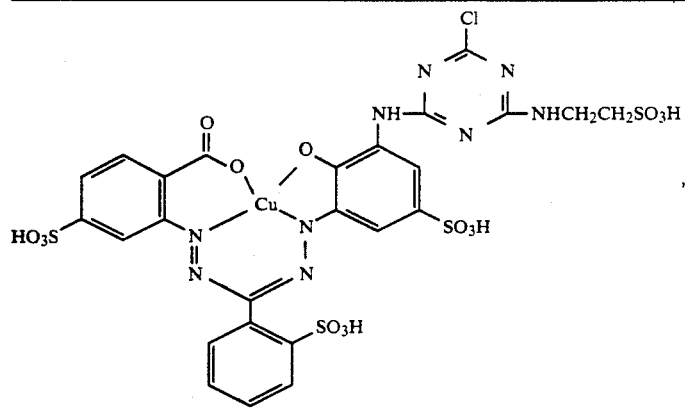
(115)
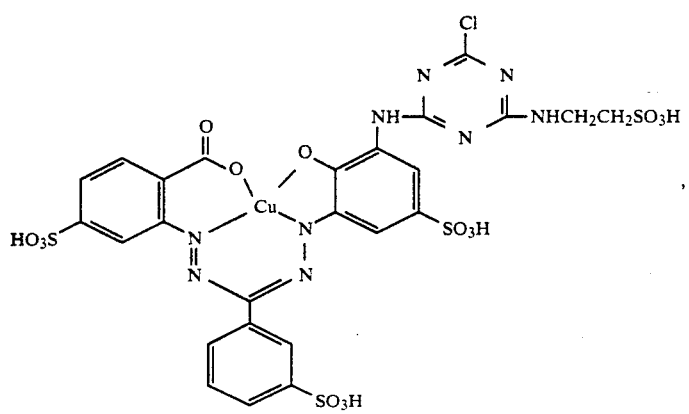
(116)
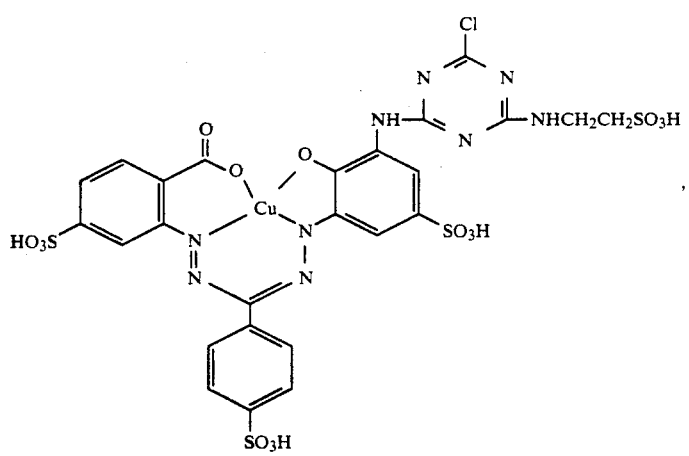
(117)
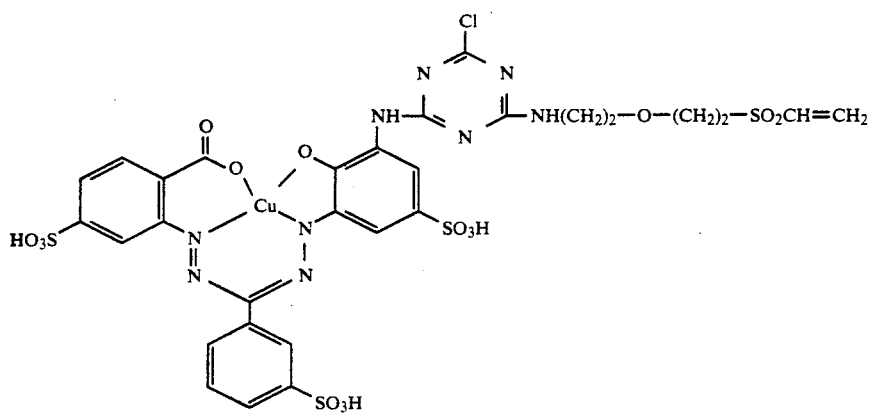
(119)
(118)

or

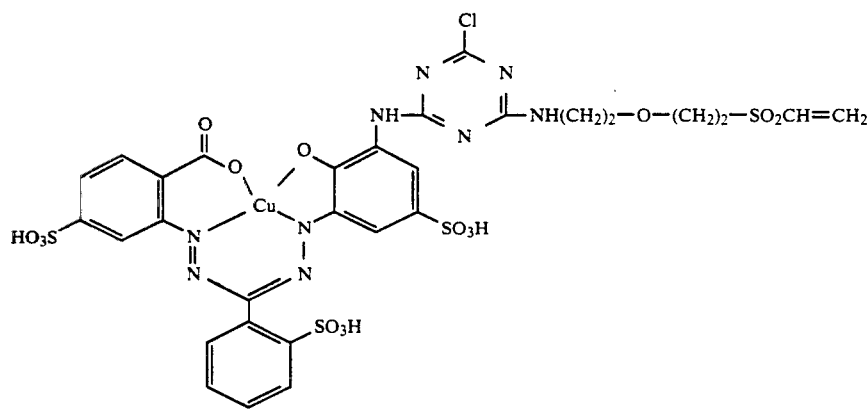
(120)

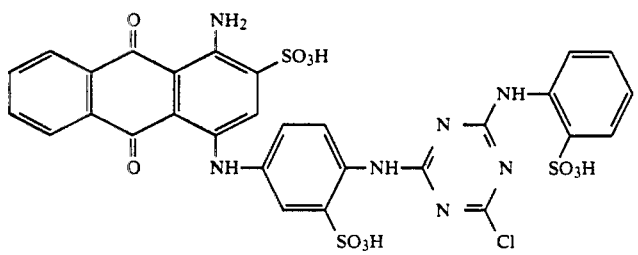
(121)

or

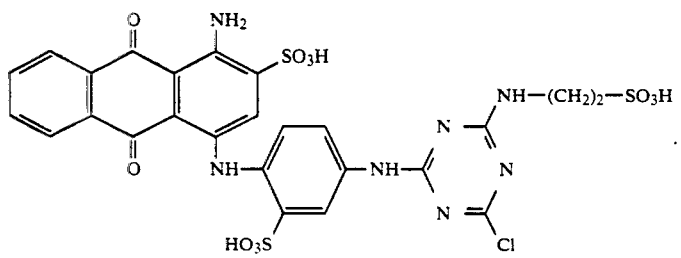
(122)

EXAMPLE 4

Bleached mercerised cotton satin is printed under normal screen printing conditions with a print paste of the following composition:

| | |
|---|---|
| 10 g | of the yellow dyeing dye of formula (107) |
| 5 g | of the red dyeing dye of formula (104) |
| 5 g | of the blue dyeing dye of formula (103) |
| 340 g | of water |
| 100 g | of urea |
| 20 g | of $Na_2CO_3$ |
| 1 g | of the sodium salt of m-nitrobenzenesulfonic acid |
| 500 g | of alginate thickener (5%) |
| 1000 g | of print paste |

The material is then dried for 5 minutes at 90° C. and fixed for 8 minutes at 102° C. with saturated steam.

The material is thereafter washed as described in Example 3. A level brownish-beige print of good fastness properties and free from two-sidedness is obtained.

Level prints of good fastness properties and free from two-sidedness are also obtained by using in place of the yellow dyeing dye of formula (107) an equivalent amount of one of the dyes of formula (101), (105) or (106), and in place of the red dyeing dye of formula (104) an equivalent amount of a dye of formulae (108) to (111), and in place of the blue dyeing dye of formula (103) an equivalent amount of a dye of formulae (112) to (122).

What is claimed is:

1. A process for dyeing or printing cellulosic textile fibre materials by the trichromatic technique, which process comprises dyeing or printing said materials from an aqueous liquor with at least one red or reddish brown dyeing dye of formula

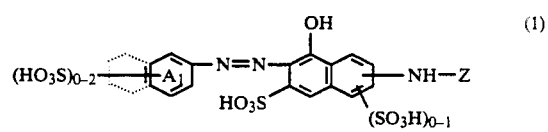
(1)

or

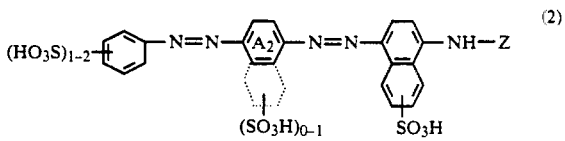
(2)

and at least one yellow or orange dyeing dye of formula

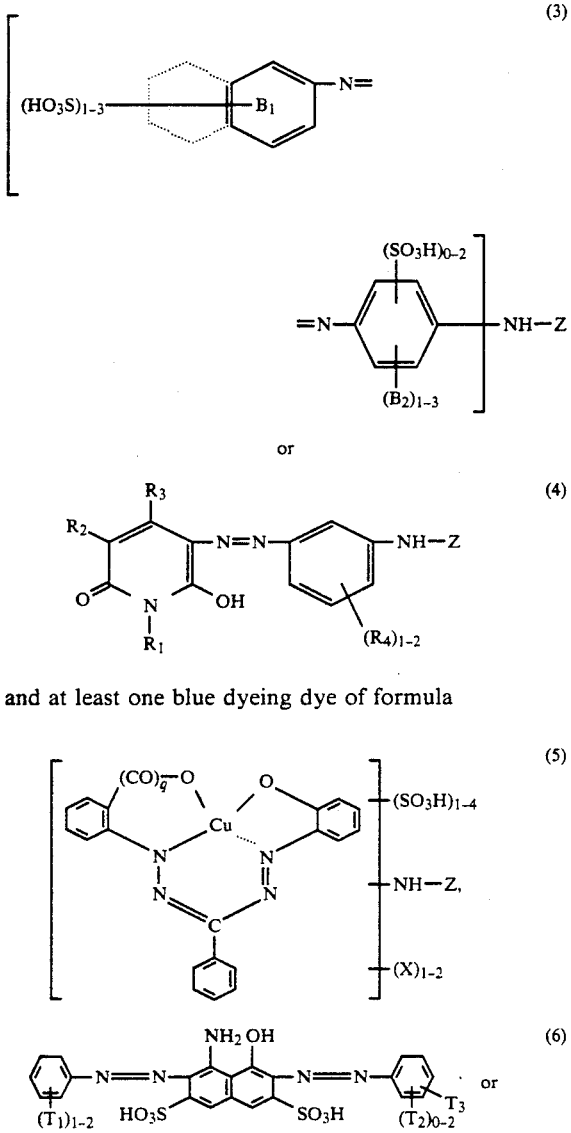

and at least one blue dyeing dye of formula

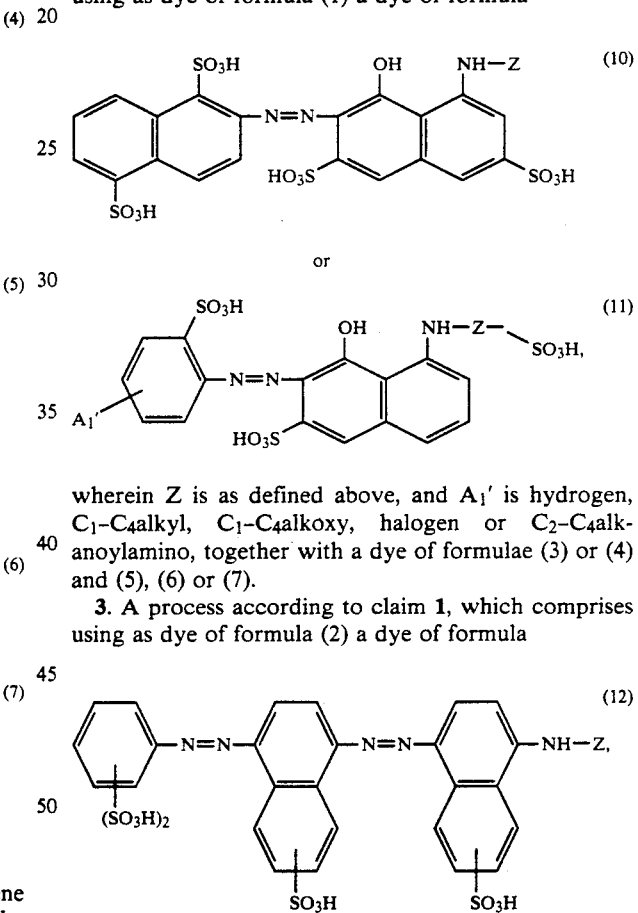

in which formulae (1), (2) and (3) above the benzene rings $A_1$, $A_2$ and $B_1$ may be further substituted, and the benzene rings $A_1$, $A_2$ and $B_1$, together with the fused benzene rings indicated in dashed outline, denote possible alternative naphthalene rings, $(B_2)_{1-3}$ denotes 1 to 3 substituents $B_2$, each independently of one another selected from the group consisting of hydrogen, $C_1$-$C_4$alkyl, $C_1$-$C_4$alkoxy, $C_2$-$C_4$alkanoylamino, halogen, nitro, cyano, trifluoromethyl, sulfamoyl, carbamoyl, amino, hydroxy, carboxy, sulfomethyl, sulfo or ureido, $R_1$ and $R_3$, each independently of the other, are hydrogen, $C_1$-$C_4$alkyl or phenyl, and $R_2$ is hydrogen, cyano, carbamoyl or sulfomethyl, $(R_4)_{1-2}$ denotes 1 to 2 substituents $R_4$, each independently of the other selected from the group consisting of hydrogen and sulfo, $(X)_{1-2}$ denotes 1 to 2 substituents X, each independently of the other selected from the group consisting of hydrogen, $C_1$-$C_4$alkyl, $C_1$-$C_4$alkoxy, halogen, $C_2$-$C_4$alkanoylamino, hydroxy, carboxy, sulfo, cyano or nitro, q is 0 or 1, $(T_1)_{1-2}$ denotes 1 to 2 substituents $T_1$, each independently of the other selected from the group consisting of sulfo and —$SO_2$—Z′, where Z′ is β-sulfatoethyl, β-haloethyl or vinyl, $(T_2)_{1-2}$ denotes 1 to 2 substituents $T_2$, each independently of the other selected from the group consisting of hydrogen and sulfo, $T_3$ is the radical —NH—Z or —CONH—$(CH_2)_{2-3}$—$SO_2$—Z′, and Z′ has the given meaning, $(Y)_{1-3}$ denotes 1 to 3 substituents Y, each independently of one another selected from the group consisting of hydrogen and $C_1$-$C_4$alkyl, and Z in formulae (1) to (7) is a 2-chloro-s-triazin-6-yl radical which contains in 4-position an unsubstituted or substituted amino group.

2. A process according to claim 1, which comprises using as dye of formula (1) a dye of formula

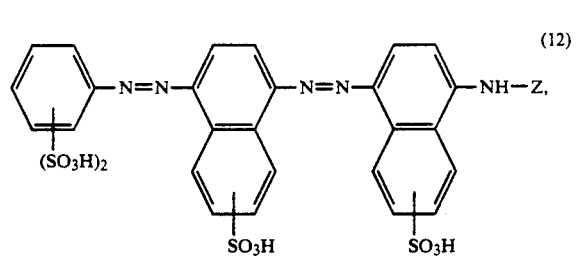

wherein Z is as defined above, and $A_1′$ is hydrogen, $C_1$-$C_4$alkyl, $C_1$-$C_4$alkoxy, halogen or $C_2$-$C_4$alkanoylamino, together with a dye of formulae (3) or (4) and (5), (6) or (7).

3. A process according to claim 1, which comprises using as dye of formula (2) a dye of formula

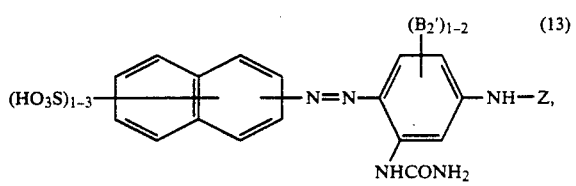

wherein Z is as defined above, together with a dye of formulae (3) or (4) and (5), (6) or (7).

4. A process according to claim 1, which comprises using as dye of formula (3) a dye of formula wherein $(B_2')_{1-2}$ denotes 1 to 2 substituents $B_2'$, each independently selected from the group consisting of hydrogen, halogen, nitro, cyano, trifluoromethyl, sulfamoyl, carbamoyl, $C_{1-4}$alkyl, $C_{1-4}$alkoxy, amino, acetylamino, ureido, hydroxy, carboxy, sulfomethyl and sulfo, and Z is as defined above, together with a dye of formula (1) or (2) and (5), (6) or (7).

5. A process according to claim 1, which comprises using as dye of formula (5) a dye of formula

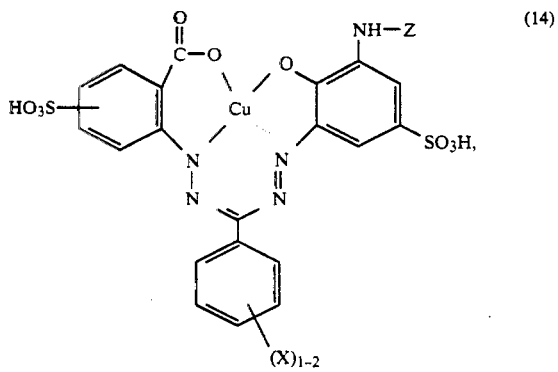

wherein $(X)_{1-2}$ denotes 1 to 2 substituents X, each independently selected from the group consisting of hydrogen, halogen, $C_1$-$C_4$alkyl, $C_1$-$C_4$alkoxy, $C_2$-$C_4$alkanoylamino, hydroxy, carboxy and sulfo, and Z is as defined in claim 1, together with a dye of formula (1) or (2) and (3) or (4).

6. A process according to claim 1, which comprises using as dye of formula (5) a dye of formula

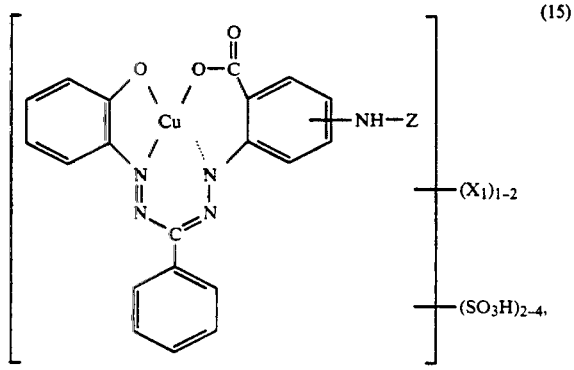

wherein $(X_1)_{1-2}$ denotes 1 to 2 substituents $X_1$, each independently selected from the group consisting of hydrogen, halogen, $C_1$-$C_4$alkyl, $C_1$-$C_4$alkoxy, $C_2$-$C_{4}$alkanoylamino, hydroxy and carboxy, and Z is as defined in claim 1, together with a dye of formula (1) or (2) and (3) or (4).

7. A process according to claim 1, which comprises using as dye of formula (6) a dye of formula

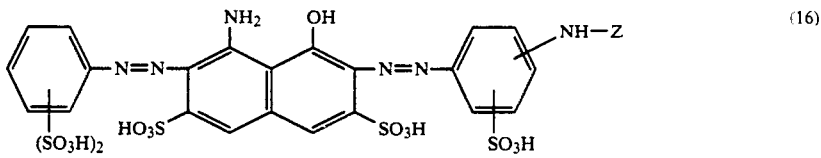

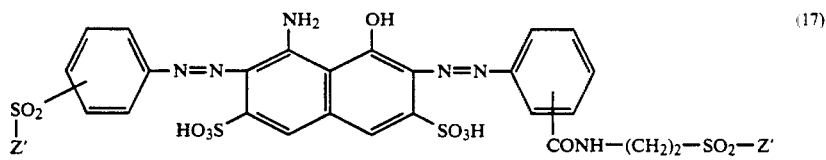

wherein Z and Z' are as defined in claim 1, together with a dye of formula (1) or (2) and (3) or (4).

8. A process according to claim 1, which comprises using a dye wherein Z is a radical of formula

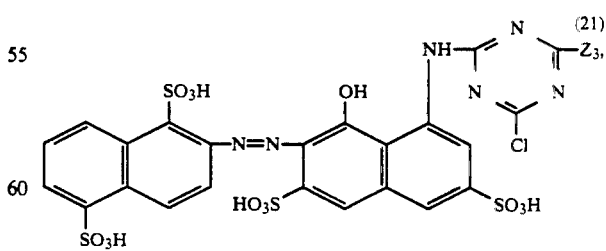

and $Z_1$ and $Z_2$ are each independently of the other hydrogen, unsubstituted or substituted $C_1$-$C_6$alkyl, unsubstituted or substituted $C_5$-$C_7$cycloalkyl or unsubstituted or substituted phenyl or naphthyl.

9. A process according to claim 8, which comprises using dyes in which Z is a radical of formula (20) and $Z_1$ and $Z_2$ are each independently of the other hydrogen, $C_1$-$C_6$alkyl which may be substituted by hydroxy, $C_1$-$C_4$alkoxy, hydroxy-$C_1$-$C_4$alkoxy, halogen, sulfo, sulfato or a fibre-reactive radical, $C_5$-$C_7$cycloalkyl which may be substituted by $C_1$-$C_4$alkyl, phenyl or naphthyl which may be substituted by $C_1$-$C_4$alkyl, $C_1$-$C_4$hydroxyalkyl, $C_1$-$C_4$alkoxy, halogen, $C_2$-$C_4$alkanoylamino, sulfo or a further fibre-reactive radical, or wherein —N($Z_1$)$Z_2$ is a radical of formulae (8b) to (8g), or is morpholino, piperidino or piperazino.

10. A process according to claim 2, which comprises using as dye of formula (10) a dye of formula

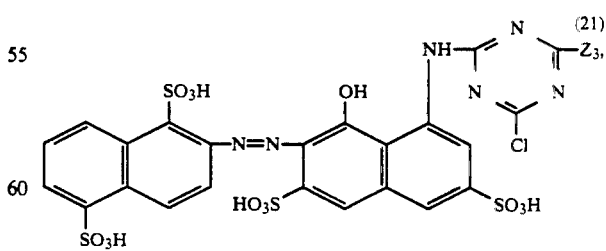

wherein $Z_3$ is morpholino, N-methylanilino, N-ethylanilino or —NH—(CH$_2$)$_2$—O—(CH$_2$)$_2$—SO$_2$—Z', where Z' is β-sulfatoethyl, β-chloroethyl or vinyl.

11. A process according to claim 2, which comprises using as dye of formula (11) the dye of formula

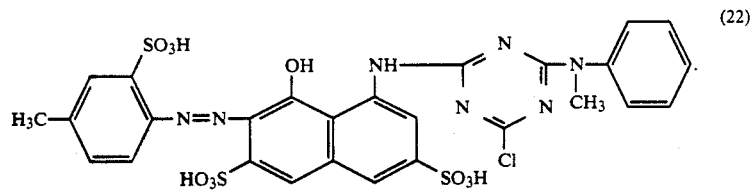
(22)
12. A process according to claim 3, which comprises using as dye of formula (12) a dye of formula
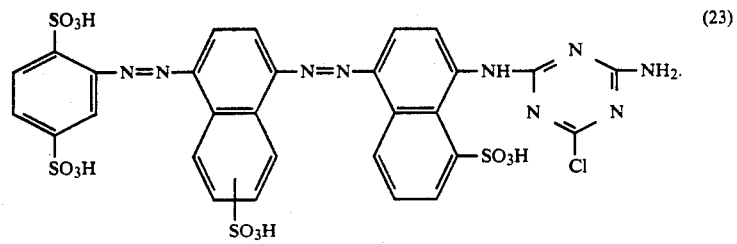
(23)
13. A process according to claim 4, which comprises using as dye of formula (13) the dye of formula
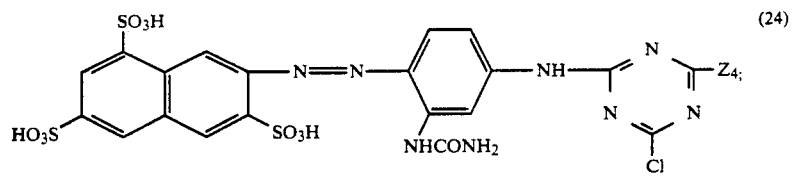
(24)
wherein $Z_4$ is β-sulfoethylamino, β-sulfatoethylamino, morpholino or —NH—$(CH_2)_2$—O—$(CH_2)_2$—OH.
14. A process according to claim 5, which comprises using as dye of formula (14) the dye of formula
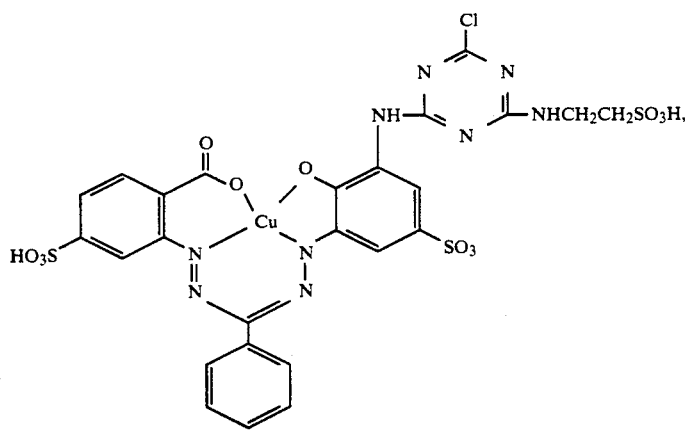
(25)
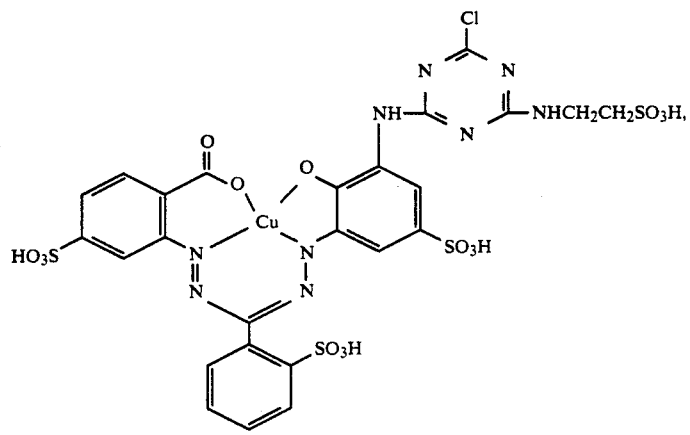
(26)

-continued
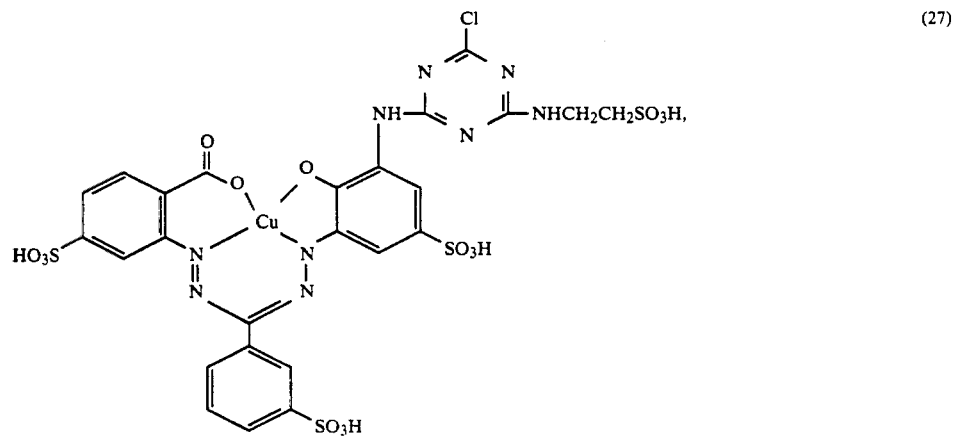
(27)
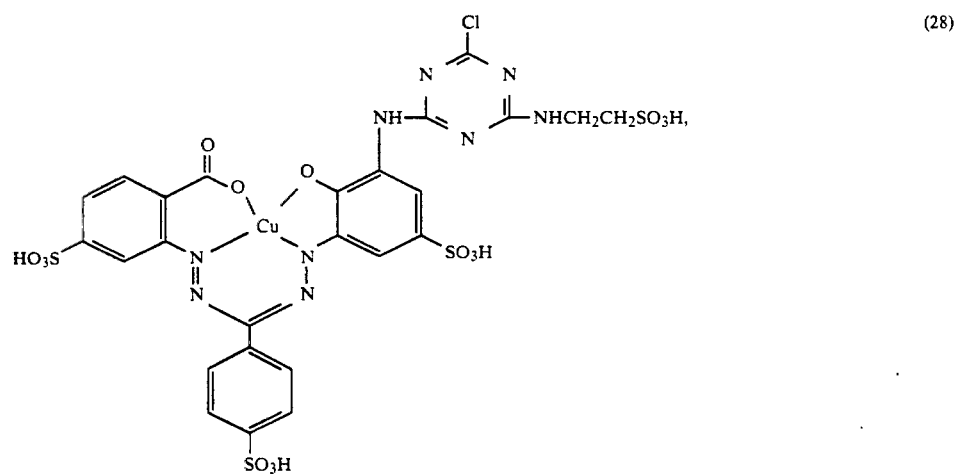
(28)
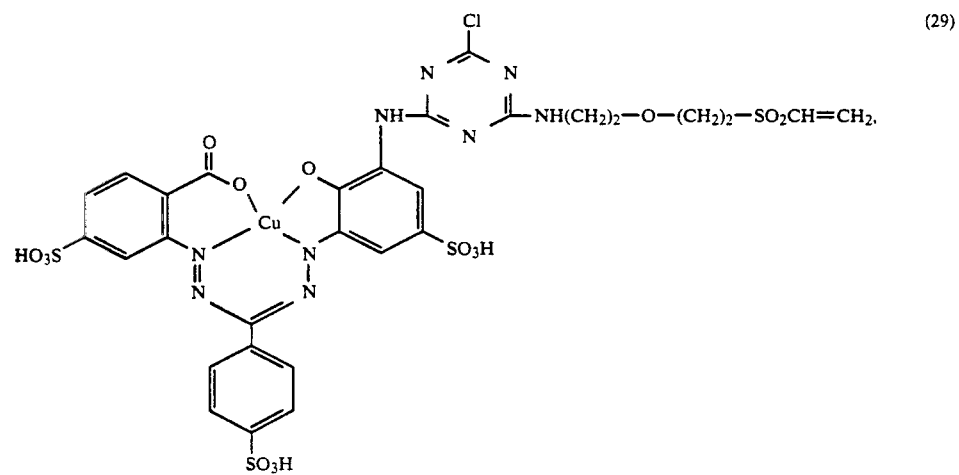
(29)

-continued
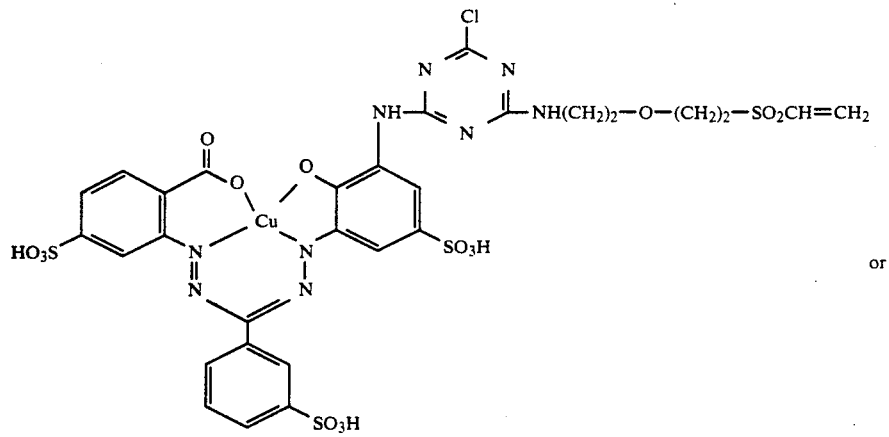
or
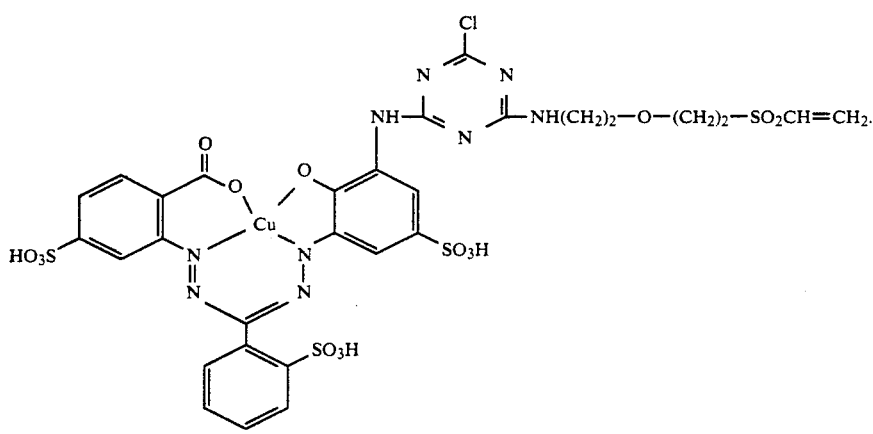
15. A process according to claim 6, which comprises using as dye of formula (15) a dye of formula
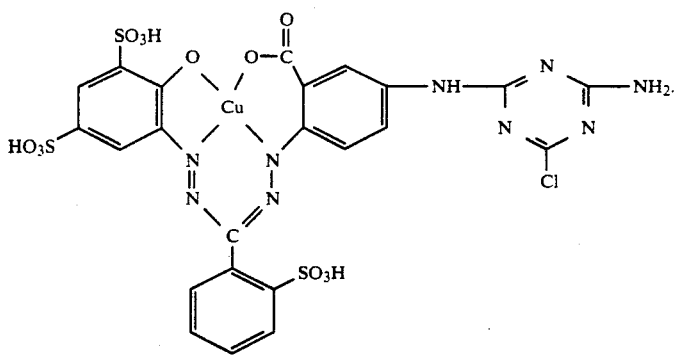
16. A process according to claim 7, which comprises using as dye of formula (16) a dye of formula
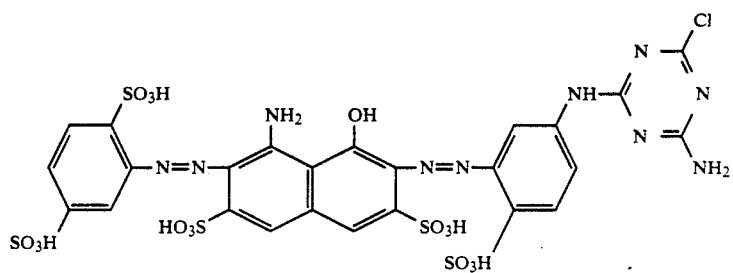
and as dye of formula (17) a dye of formula

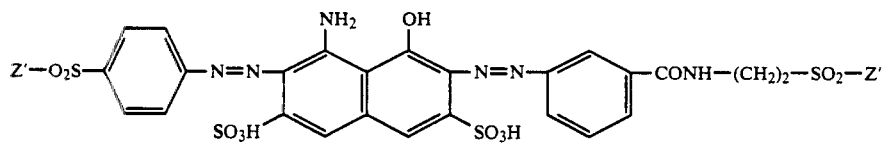
(34)
wherein Z' is as defined in claim 7.
17. A process according to claim 1, which comprises using one of the dyes of formulae (35), (36), (37) and (38)
and one of the dyes of formulae (39), (22), (40), (41) and (42)
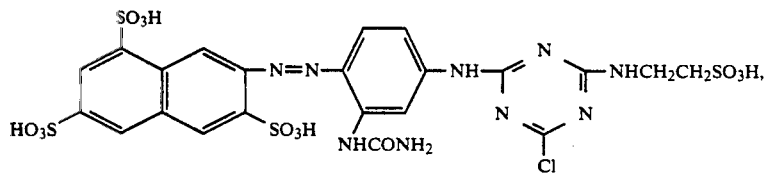
(35)
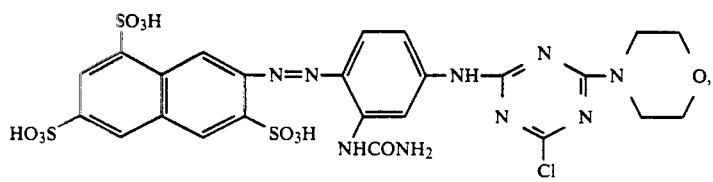
(36)
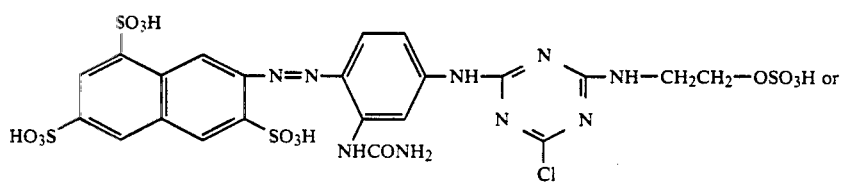
(37)
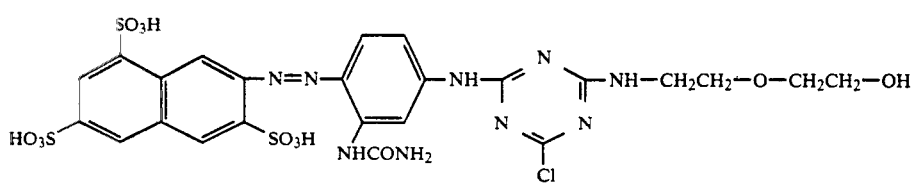
(38)
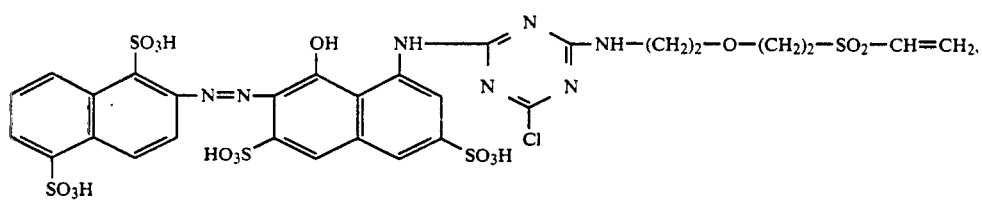
(39)
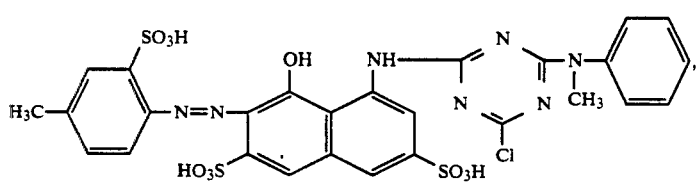
(22)
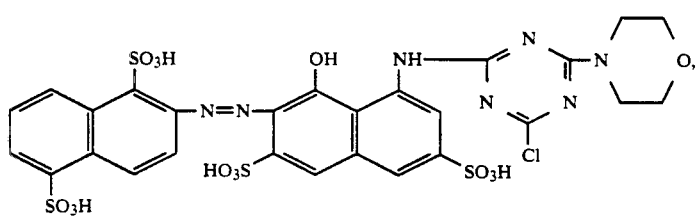
(40)

-continued
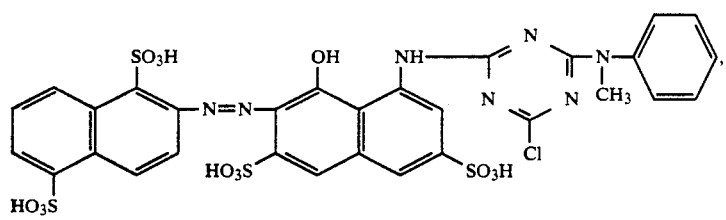
(41)
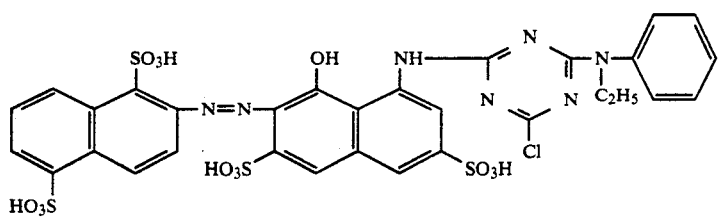
(42)
together with the dye of formula
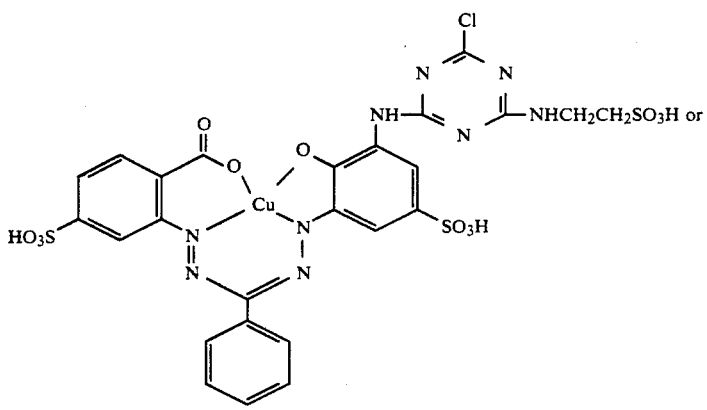
(25)
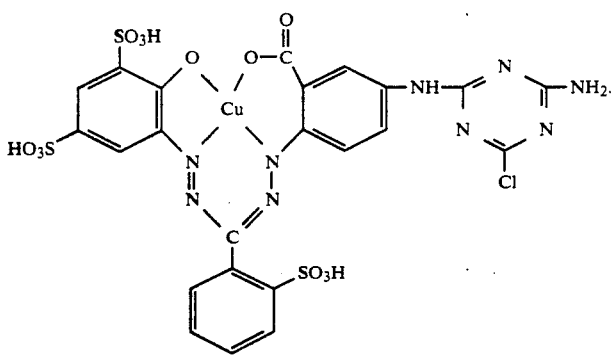
(32)
18. A process according to claim 1, which comprises using the dyes of formulae
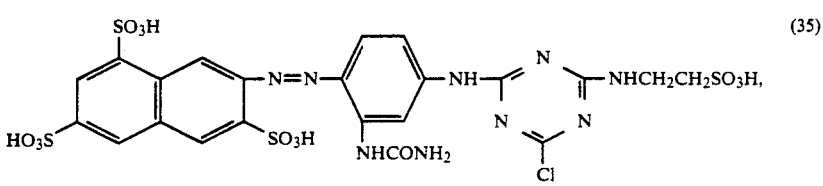
(35)

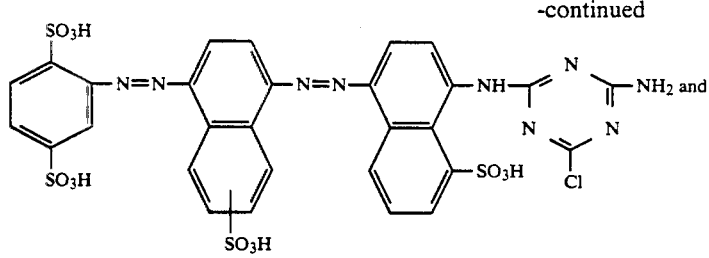
(23)
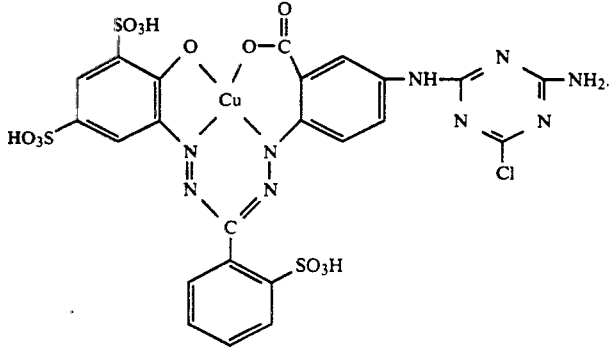
(32)
19. A process according to claim 1, which comprises using the dyes of formulae
20. A process according to claim 1 for dyeing.
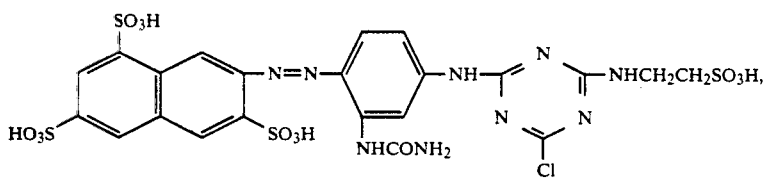
(35)
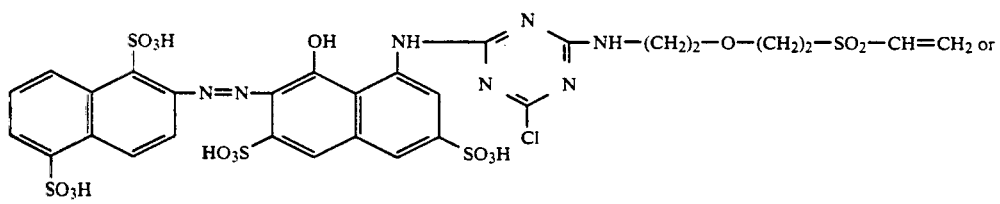
(39)
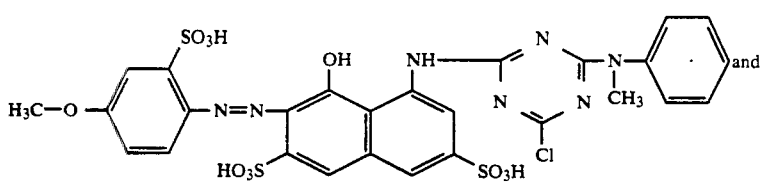
(22)
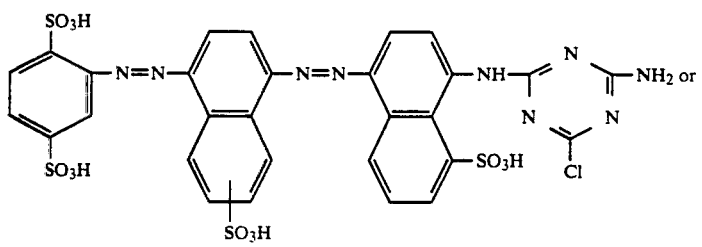
(23)
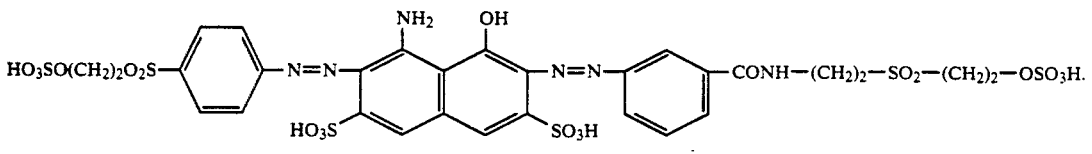
(43)

21. A process according to claim 20, wherein dyeing is carried out continuously.

22. A process according to claim 1 for printing.

23. A process according to claim 1, which comprises impregnating cellulosic textile fibre material with dyes according to claim 1, and steaming or thermofixing said material to fix the dyes.

24. A process according to claim 1, which comprises applying the reactive dyes from a padding liquor in a liquor to goods ratio of 1:0.5 to 1:1.2.

25. A process according to claim 1, wherein the fibre material is cotton.

26. A process according to claim 1, which comprises applying the reactive dyes with a padding liquor, drying the fibre material, thereafter impregnating the goods with a liquor which contains fixing alkali, and subsequently steaming the goods.

27. A process according to claim 1, wherein steaming is carried out in the temperature range from 100° to 120° C.

28. A process according to claim 1, which comprises applying the reactive dyes with a padding liquor in the presence of a fixing alkali, drying the goods and thereafter thermofixing them in the temperature range from 110° to 220° C.

29. A process according to claim 26, wherein the fixing alkali is selected from alkali metal carbonates, alkali metal hydrogencarbonates or alkali metal phosphates or mixtures of the fixing alkalies.

30. A process according to claim 28, wherein the fixing alkali is selected from alkali metal carbonates, alkali metal hydrogencarbonates or alkali metal phosphates or mixtures of the fixing alkalies.

31. A process according to claim 29, wherein the fixing alkali is used together with a neutral salt.

32. A process according to claim 1, which comprises impregnating the fibre material with a dye solution or suspension which already contains the fixing alkali, then packing the goods airtight and storing them in the temperature range from 10° to 40° C.

33. A process according to claim 1, which comprises printing the fibre material with a print paste comprising, in addition to one or more reactive dyes, at least one alkaline agent, optionally a solubiliser, a thickener, optionally an oxidising agent, as well as water, then, if appropriate after drying the goods, steaming or thermofixing the printed material to fix the dyes on the fibre.

* * * * *